Figure 1:
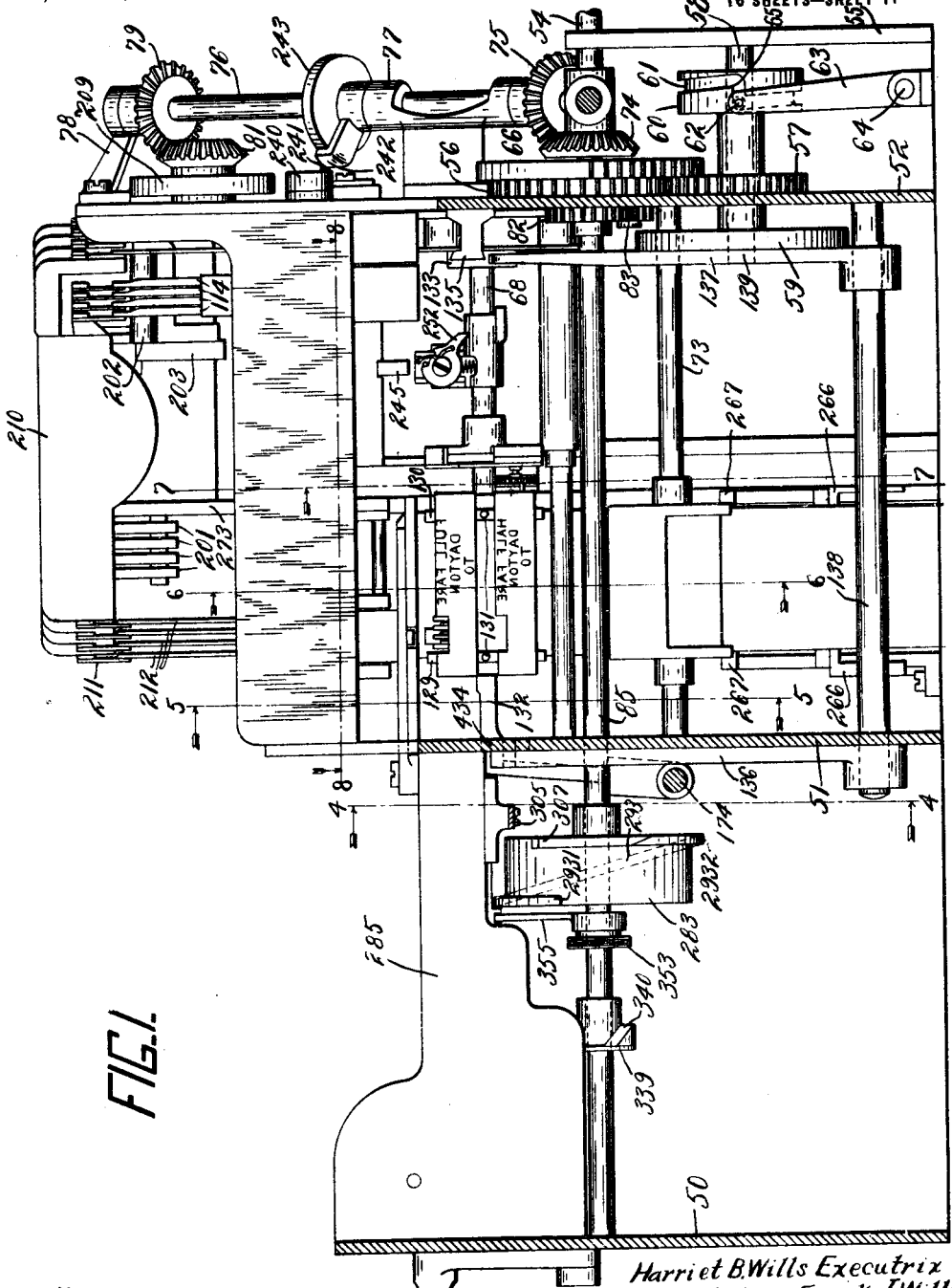

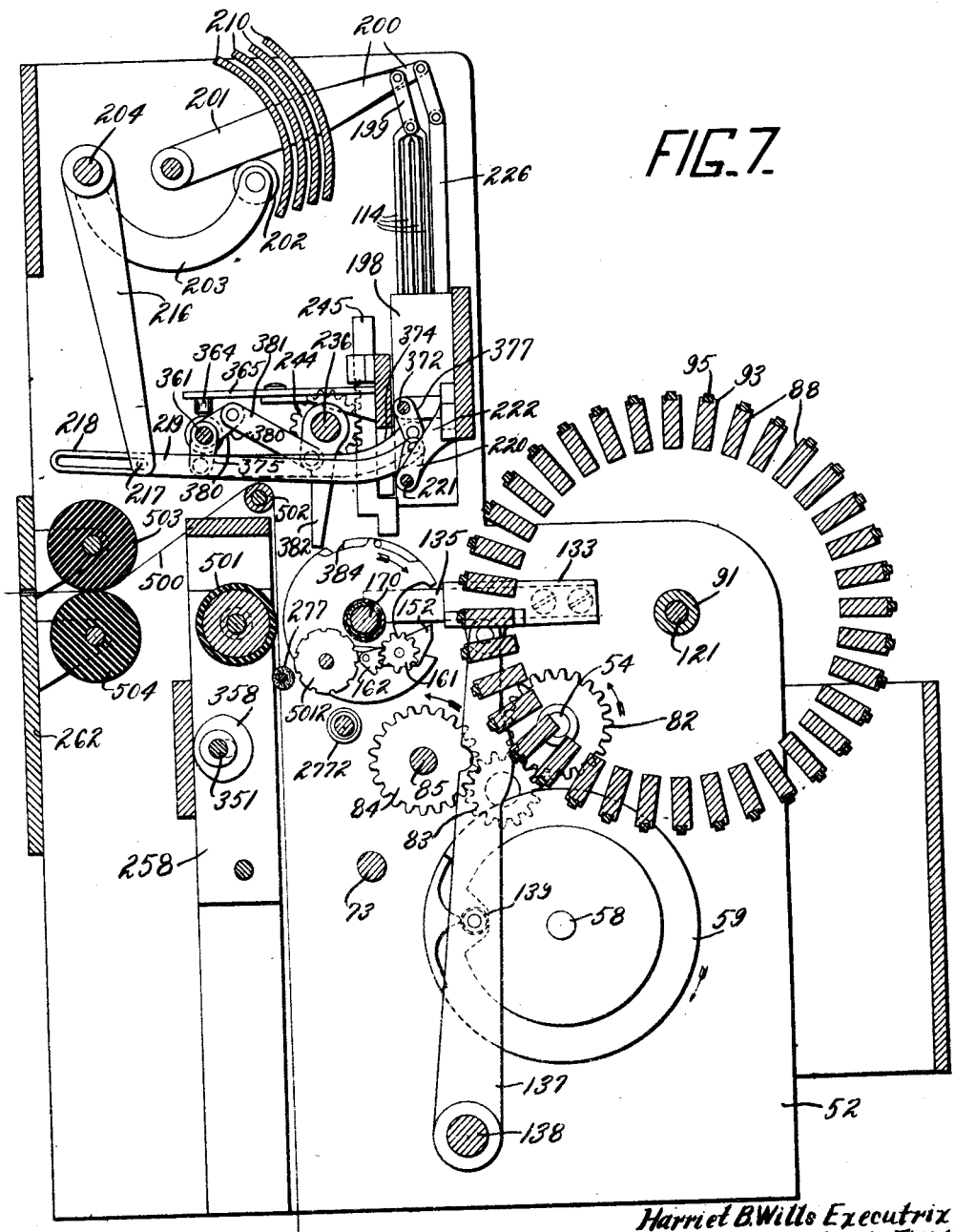

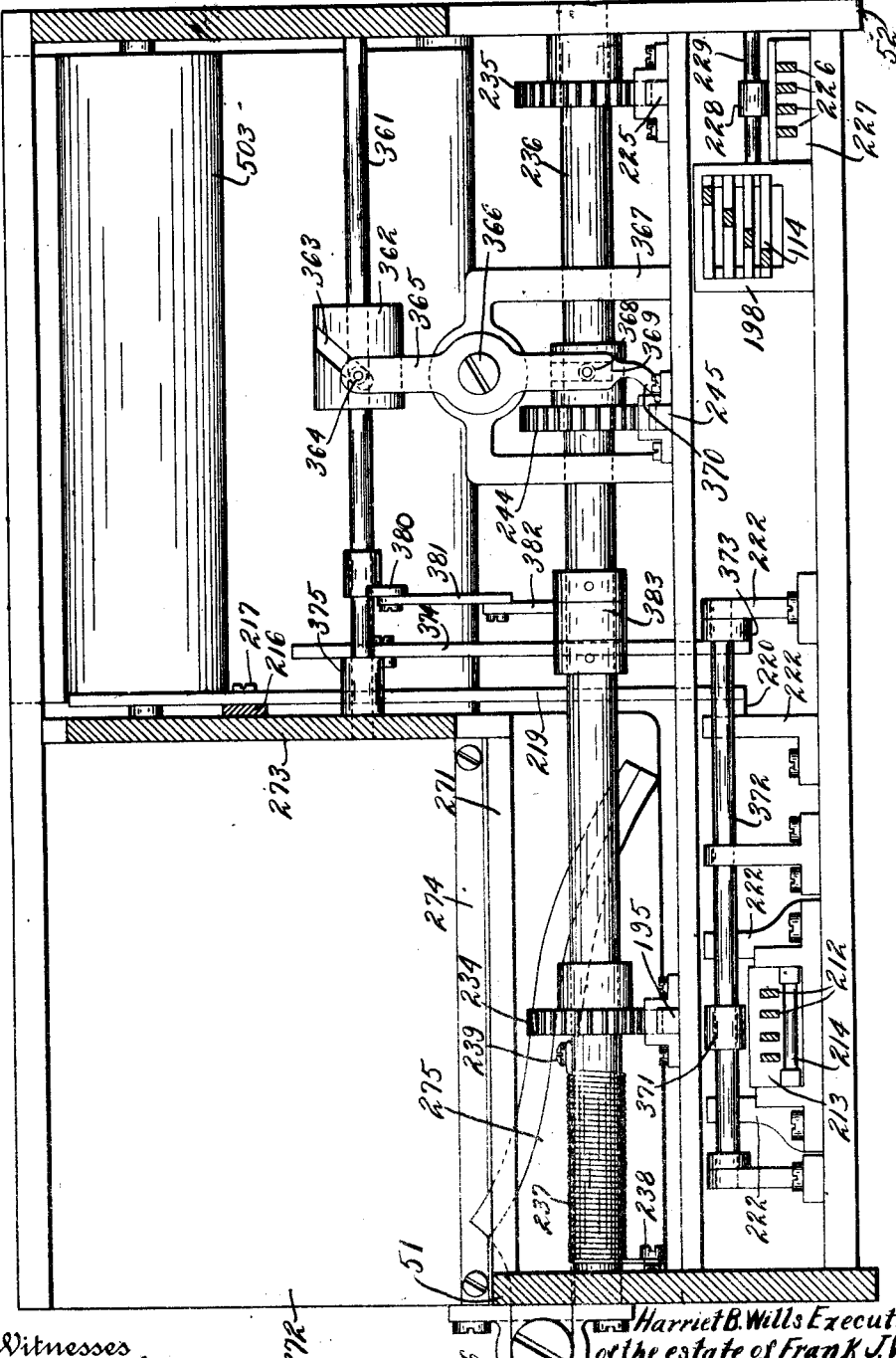

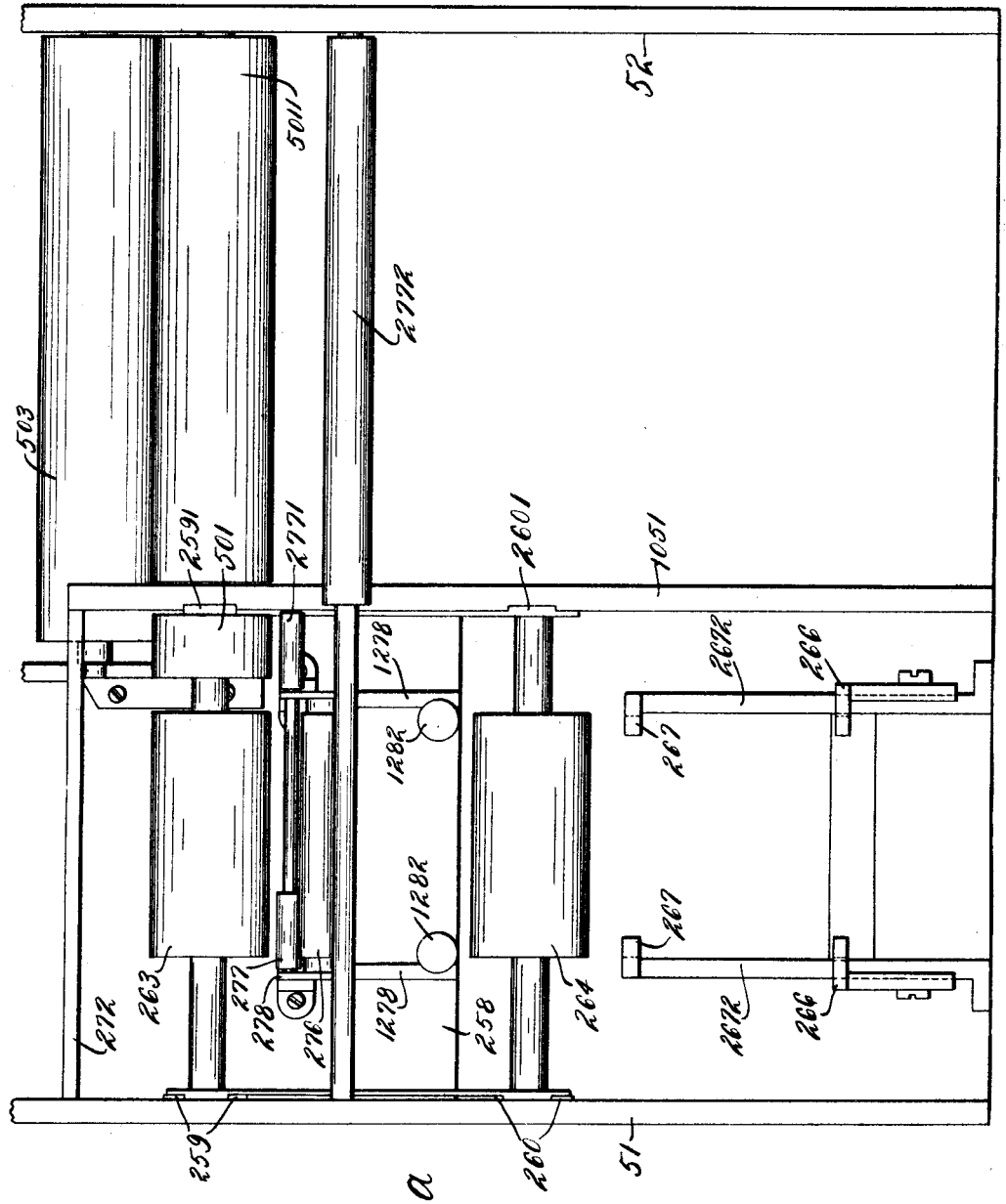

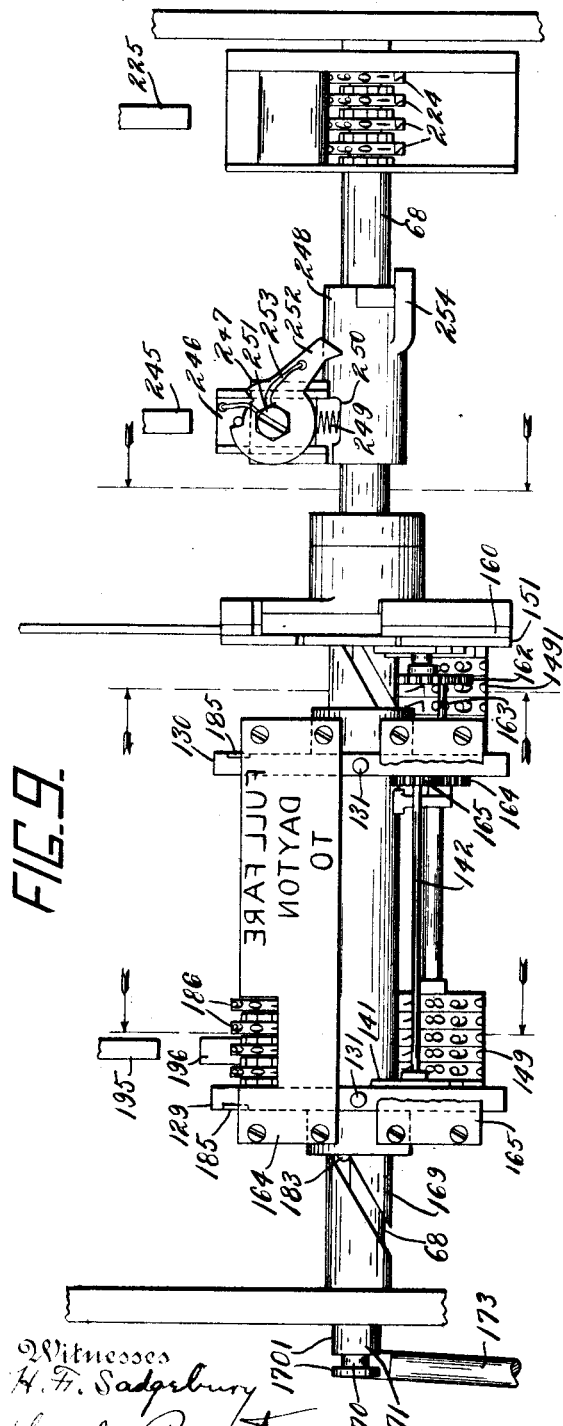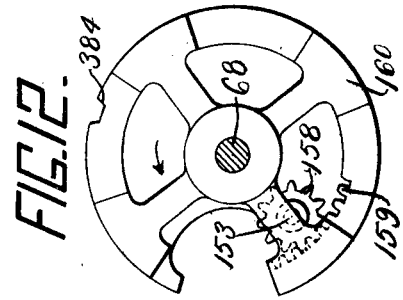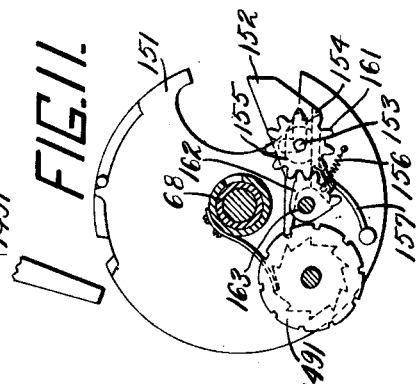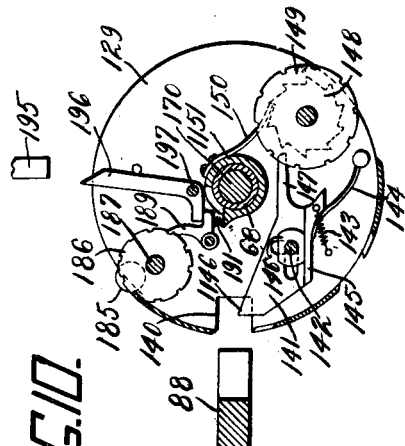

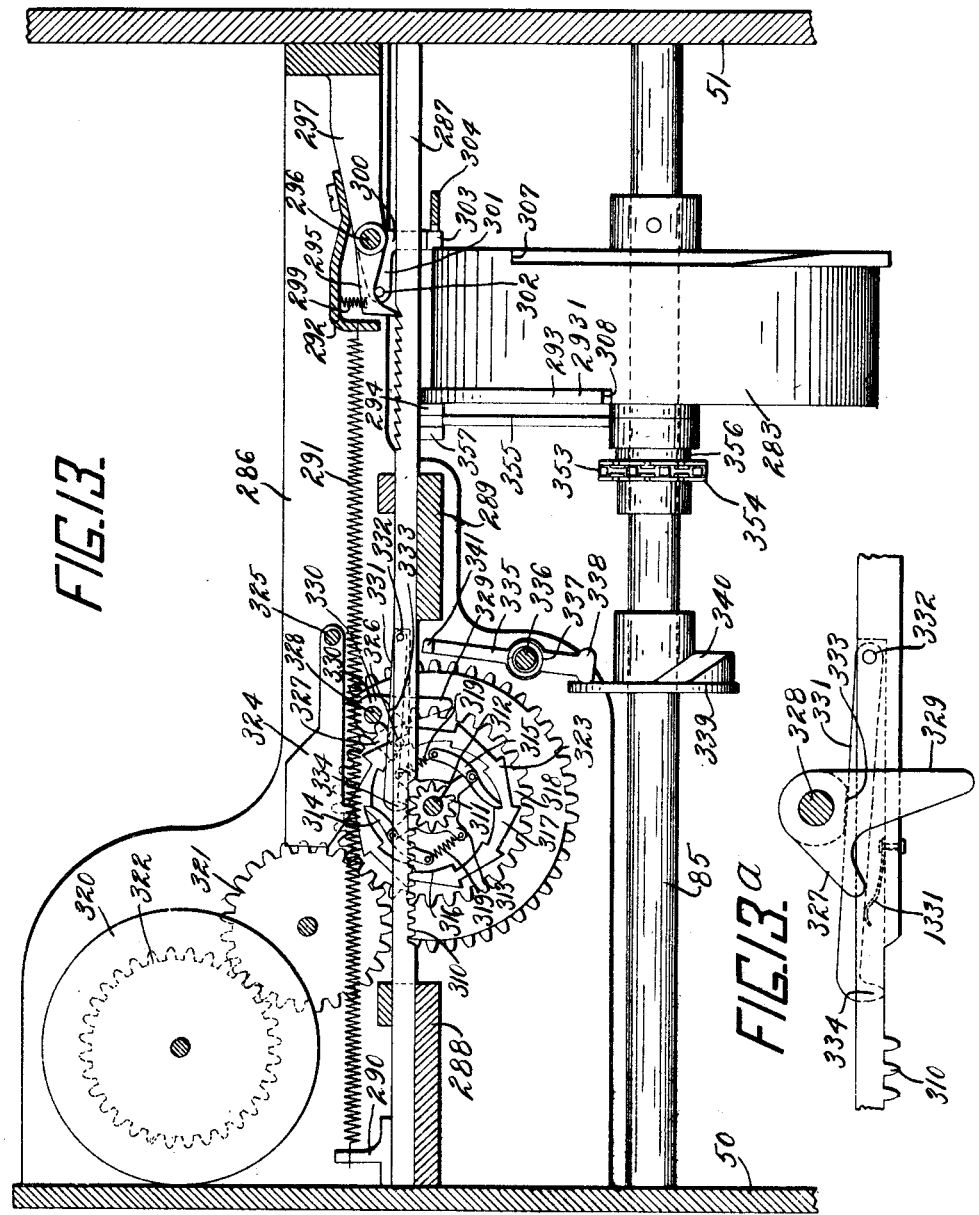

F. J. WILLS, DEC'D.
H. B. WILLS, EXECUTRIX.
RAILROAD TICKET MACHINE.
APPLICATION FILED OCT. 22, 1913.
1,188,519.
Patented June 27, 1916.
16 SHEETS—SHEET 12.
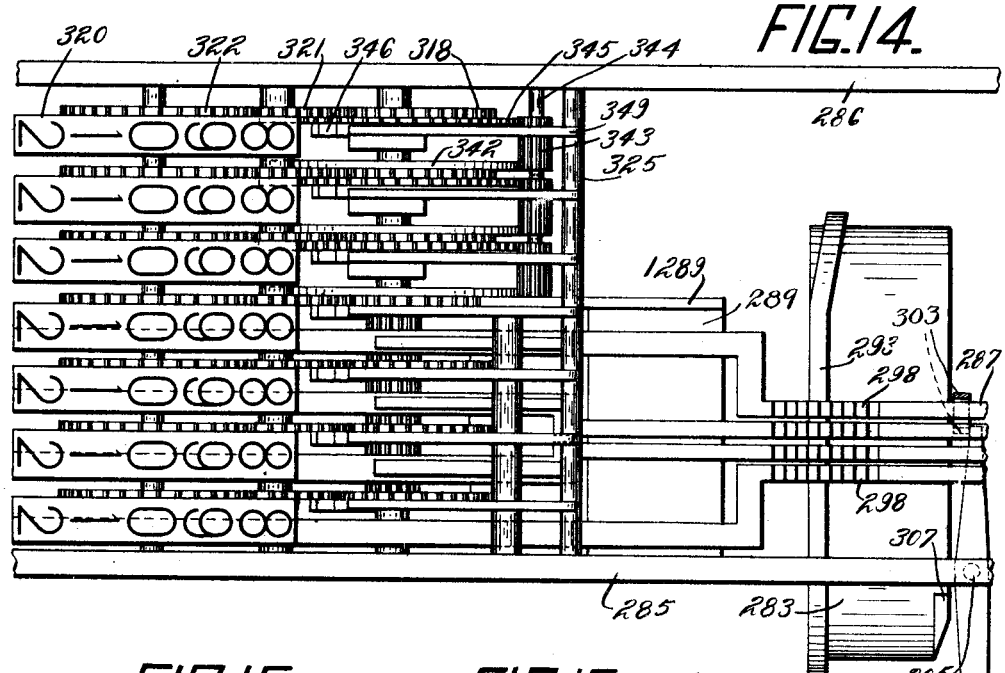
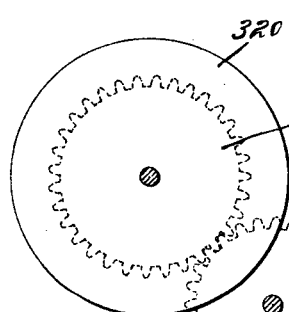
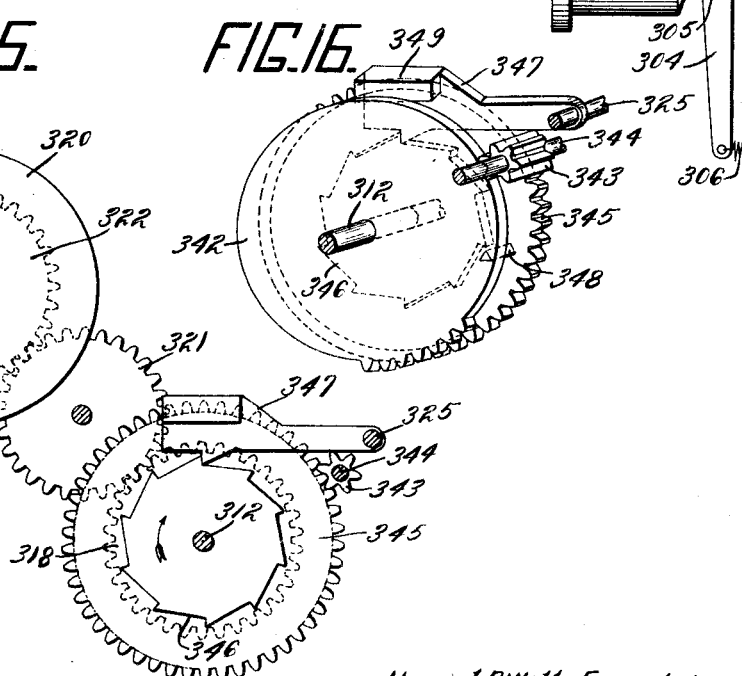

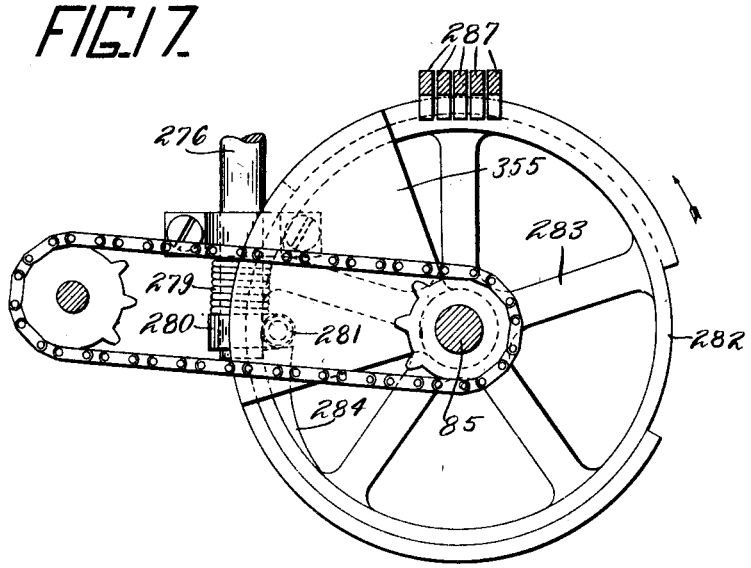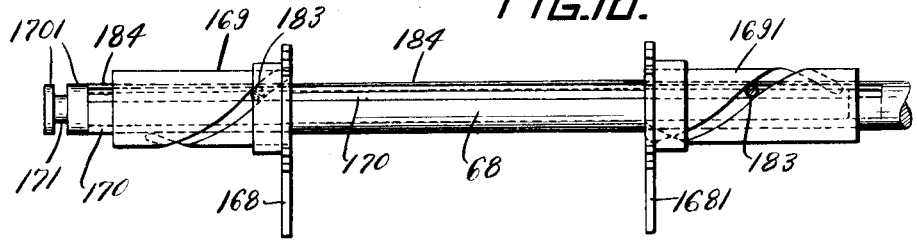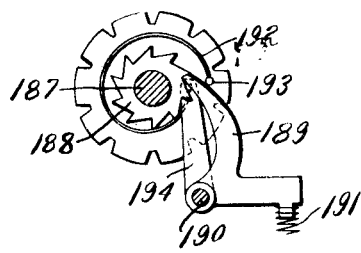

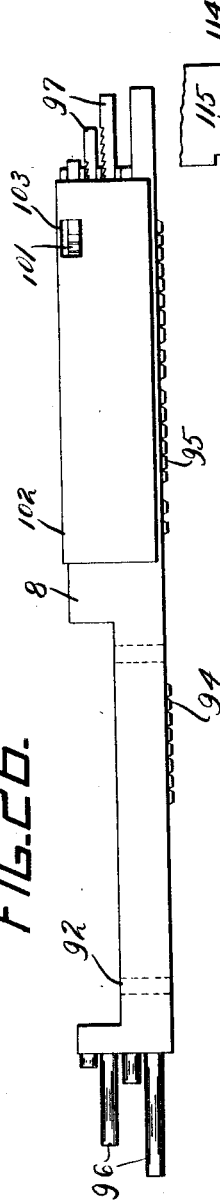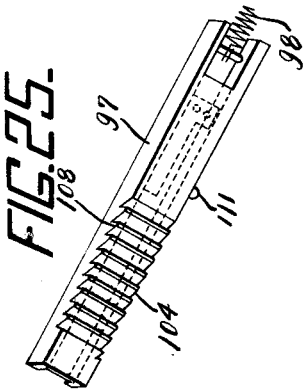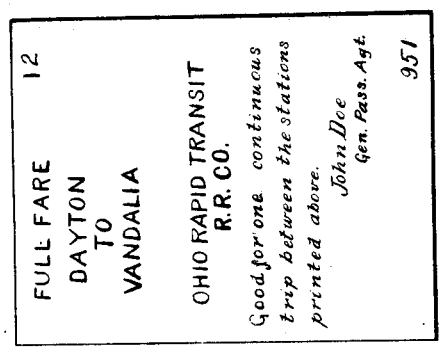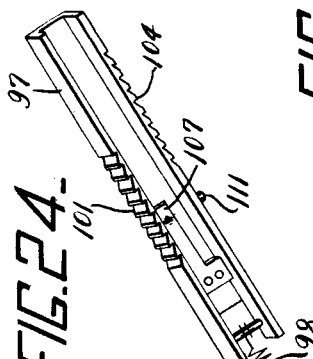

F. J. WILLS, DEC'D.
H. B. WILLS, EXECUTRIX.
RAILROAD TICKET MACHINE.
APPLICATION FILED OCT. 22, 1913.

1,188,519.

Patented June 27, 1916.
16 SHEETS—SHEET 16.

FIG. 29.

| 1 | DAYTON TO TROY | 90 |
| 2 | H. DAYTON TO WAPAKONETA | 12 |
| 3 | F. DAYTON TO LIMA | 110 |
| 4 | Ex. DAYTON TO PIQUA | 124 |
| 5 | Ex. DAYTON TO SIDNEY | 151 |
| 6 | F.F. DAYTON TO PIQUA | 125 |
| 7 | H DAYTON TO OTTAWA | 26 |
| 8 | F.F. DAYTON TO OTTAWA | 105 |
| 9 | F.F. DAYTON TO VANDALIA | 59 |
| 10 | Ex. DAYTON TO BOTKINS | 15 |
| 11 | Ex. DAYTON TO SIDNEY | 152 |
| 12 | Ex. DAYTON TO TIPP. CITY | 75 |
| 13 | H. DAYTON TO VANDALIA | 10 |
| 14 | F.F. DAYTON TO TROY | 191 |
| 15 | F.F. DAYTON TO KIRKWOOD | 22 |
| 16 | F.F. DAYTON TO TROY | 192 |

—500

| F.F. | DAYTON TO VANDALIA | 59 |
| F.F. | DAYTON TO TIPP. CITY | 112 |
| F.F. | DAYTON TO TROY | 192 |
| F.F. | DAYTON TO PIQUA | 125 |
| F.F. | DAYTON TO KIRKWOOD | 22 |
| F.F. | DAYTON TO SIDNEY | 84 |
| F.F. | DAYTON TO ANNA | 32 |
| F.F. | DAYTON TO BOTKINS | 28 |
| F.F. | DAYTON TO WAPAKONETA | 53 |
| F.F. | DAYTON TO LIMA | 110 |
| F.F. | DAYTON TO COLUMBUS GROVE | 46 |
| F.F. | DAYTON TO OTTAWA | 105 |
| H. | DAYTON TO VANDALIA | 10 |
| H. | DAYTON TO TIPP. CITY | 21 |
| H. | DAYTON TO TROY | 35 |
| H. | DAYTON TO PIQUA | 32 |

Witnesses
H. F. Sadgebury
Earl Beust

Harriet B Wills Executrix
of the estate of Frank J. Wills
Inventor
by
Chester H Braselton
Attorneys

UNITED STATES PATENT OFFICE.

FRANK J. WILLS, DECEASED, BY HARRIET B. WILLS, EXECUTRIX, OF WINCHESTER, MASSACHUSETTS, ASSIGNOR TO THE NATIONAL CASH REGISTER COMPANY, OF DAYTON, OHIO, A CORPORATION OF OHIO. (INCORPORATED IN 1906.)

RAILROAD-TICKET MACHINE.

1,188,519. Specification of Letters Patent. Patented June 27, 1916.

Application filed October 22, 1913. Serial No. 796,643.

*To all whom it may concern:*

Be it known that I, HARRIET B. WILLS, a citizen of the United States, residing at Winchester, county of Middlesex, in the State of Massachusetts, executrix of the estate of FRANK J. WILLS, late a citizen of the United States, deceased, who did in his lifetime invent certain new and useful Improvements in Railroad-Ticket Machines, do declare the following to be a full, clear, and exact description of said invention.

This invention relates to ticket issuing machines and has more particular relation to that class of ticket issuing machines adapted for use in issuing tickets for railways, steamships or analogous uses.

The general object of the present invention is to provide an efficient machine for use in railroad stations to issue tickets good only between the station at which the machine is located and other established stations along lines of travel.

It will readily be seen that the invention in its present embodiment is capable of other uses, such for instance as on steamship lines, ferry lines and lines of local travel, etc.

In modified forms the invention as a whole and also various parts thereof are capable of a large number of other uses such as in cash and credit registers, adding and calculating machines, ticket printing and issuing machines, workmen's time recorders, voting machines, bank machines, and a large number of other analogous or similar machines.

The invention as a whole or any part of the same is therefore capable of use in other embodiments without constituting a departure from the scope of the present invention.

One of the prime objects of the invention is to provide a compact and efficient machine which will enable the printing and issuing of tickets for any one of a large number of stations and for automatically controlling the recording of the issue of the ticket so as to prevent an adroit manipulation on the part of the ticket seller.

Another object of the invention is to provide a mechanism capable of issuing various classes of tickets for the same destination. In the sale of railway tickets it is necessary to provide not only for "full fare" tickets but also for "half fare" and "excursion" tickets. The present invention provides suitable controlling devices whereby tickets of the various classes may be issued by the one machine. The machine is shown as providing for the three classes of tickets above mentioned but the construction is capable of development to provide a wider scope without departing from the spirit of the invention.

Another object is to provide an improved form of totalizing mechanism for keeping a record of the total value of tickets issued of all classes and stations.

A further object of the invention is to provide an efficient machine for enabling a detail record of all tickets used, and to provide mechanism whereby a mechanical audit may be had to determine the total number of tickets issued to each station together with the class of tickets, that is, "full fare", "half fare", "excursion", etc., and the total amount of cash received or which should have been received in payment for the tickets issued.

It is one of the objects of the invention to so construct the audit controlling mechanism whereby a simple preliminary adjustment by the operator will serve to disable certain of the mechanisms which are employed in a ticket printing operation, and permit of the use of others for auditing purposes.

As an incident to the design of an efficient machine of the above type it is the purpose of the present invention also to improve the details of construction of the machine by the provision of more efficient means for keeping a detail record of tickets issued and also to provide an improved form of totalizing and printing mechanisms.

In United States Letters Patent No. 820,277, issued May 8th, 1906, to the present inventor, there is shown and described a form of ticket issuing machine which is highly efficient in the performance of the functions for which it was designed. However, the present invention contemplates the performance of additional functions such as keeping a detail record of the number of tickets of each station which are issued whereby a complete audit may be had. In railway ticket printing machines heretofore designed no means were provided for enabling a record and audit of this nature and it is one of the objects of the present invention to provide separate recording means whereby a record may at all times be kept of the number of tickets issued to each station. In the design of mechanism to perform this function there is provided an improved form of counting mechanism which is shown and described herein but which will be particularly described and claimed in a separate copending application Serial No. 796,644 filed by the present applicant on October 22, 1914.

With these and incidental objects in view, the invention consists in certain novel features of construction and combinations of parts the essential elements of which are set forth in appended claims, and a preferred form of embodiment of which is hereinafter described with reference to the drawings which accompany and form part of this specification.

Figure 2:
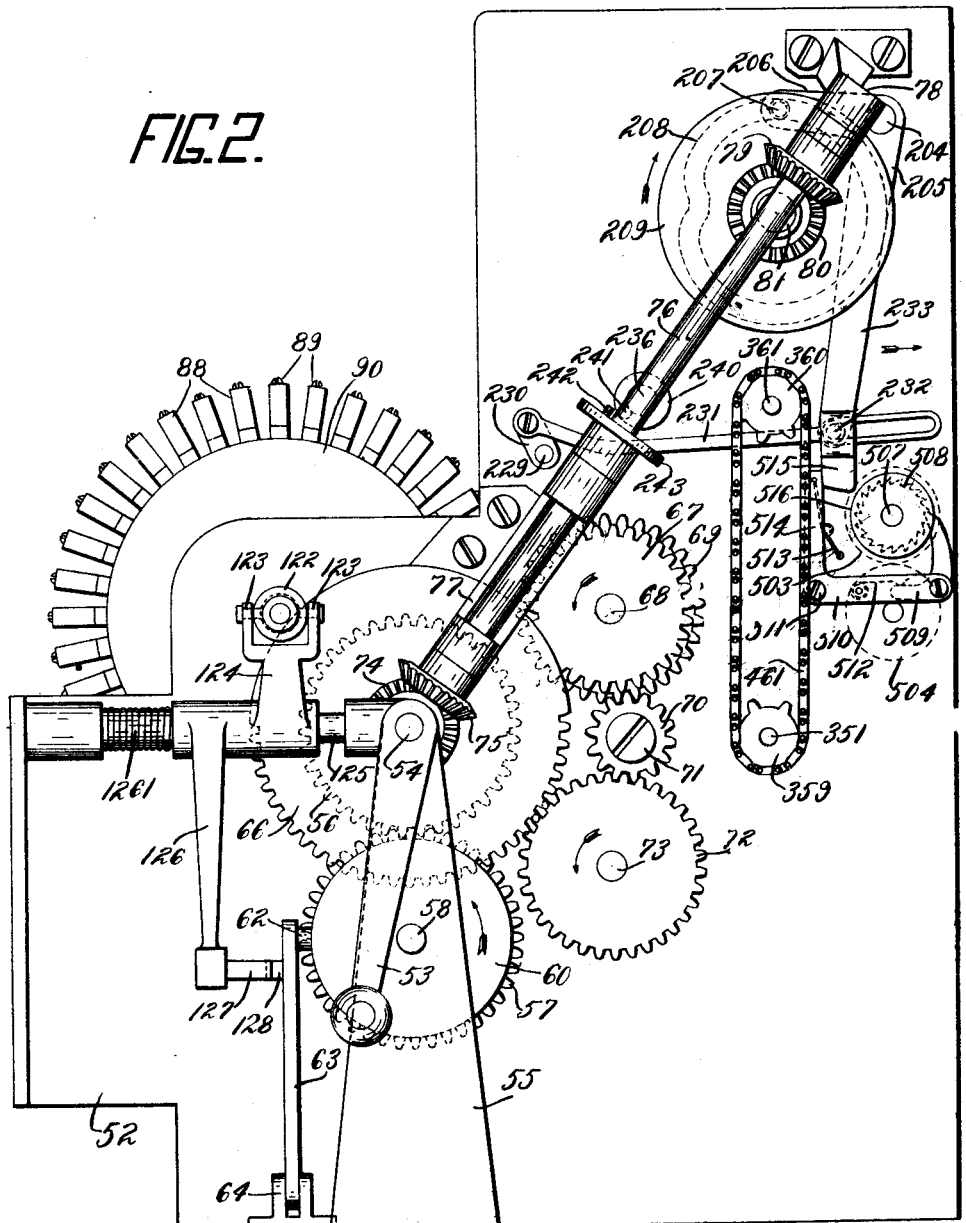
Figure 3:
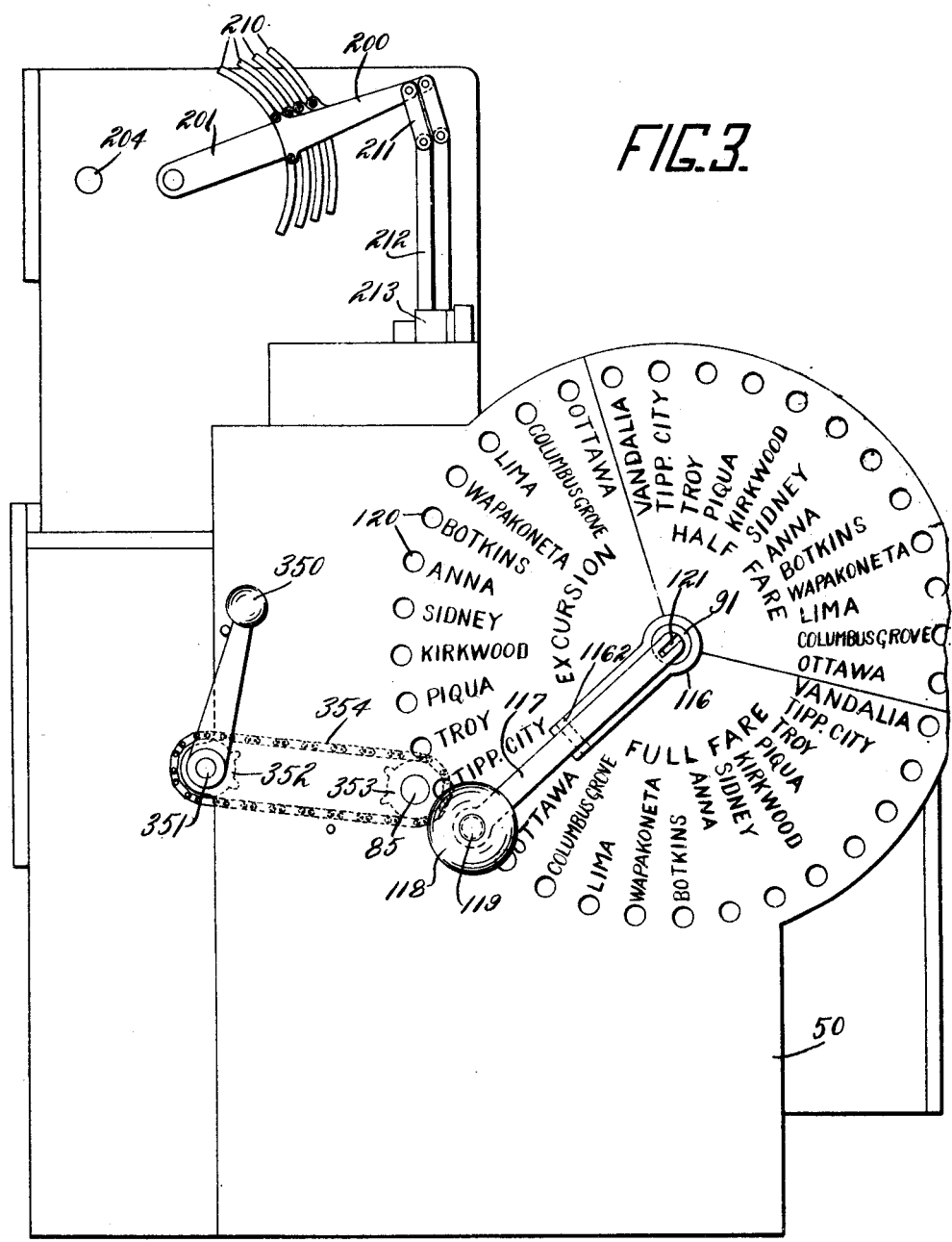
Figure 4:
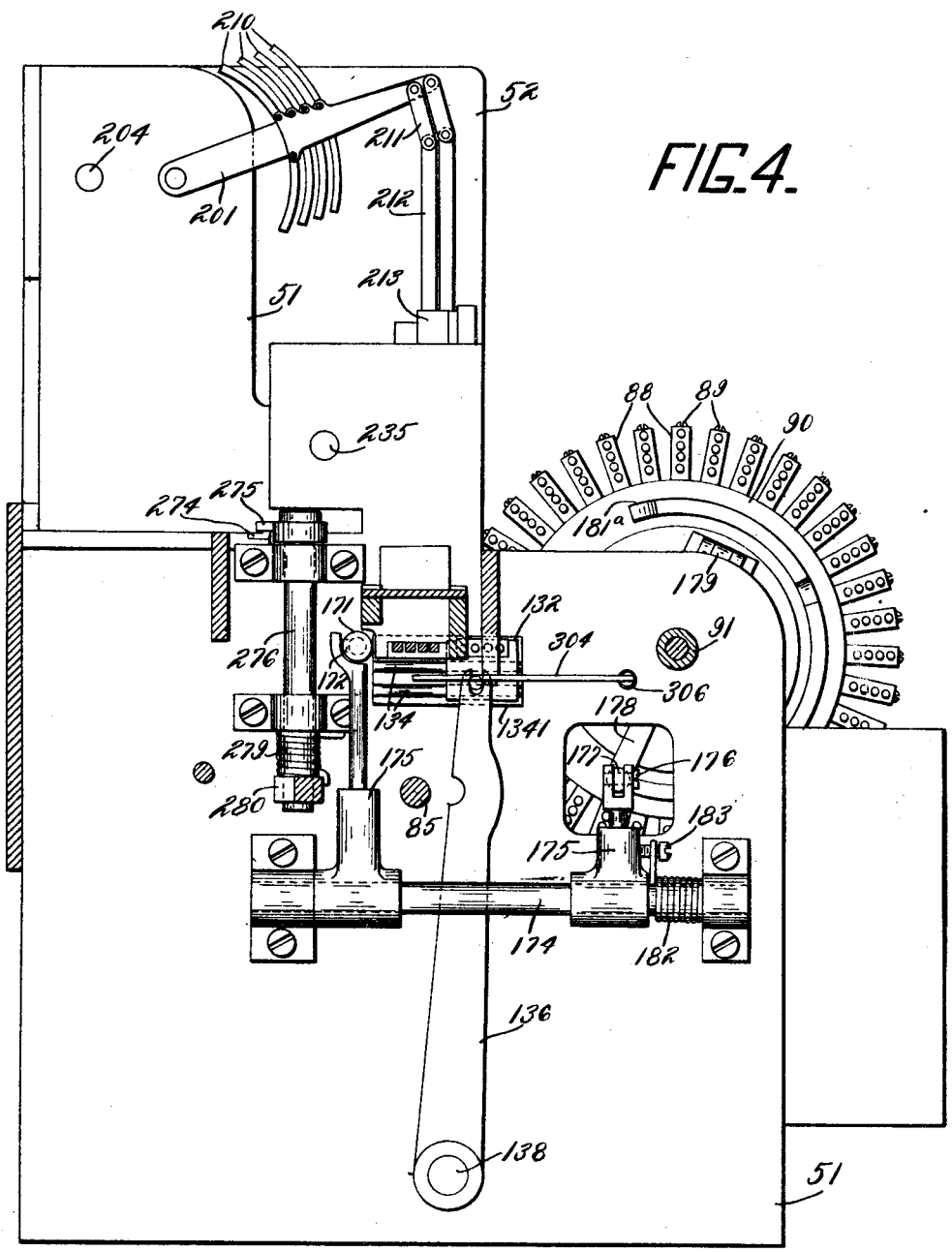
Figure 5:
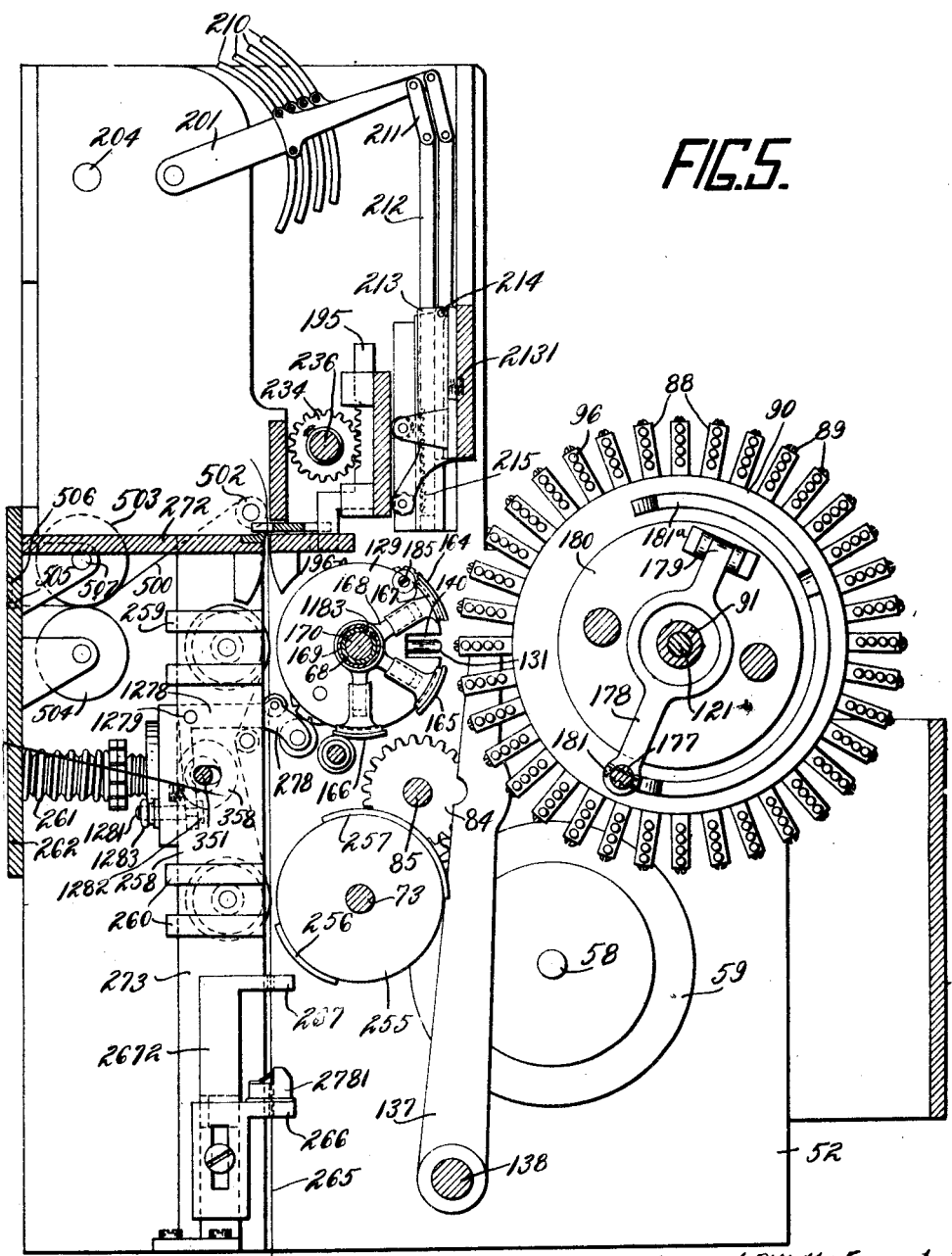
Figure 6:
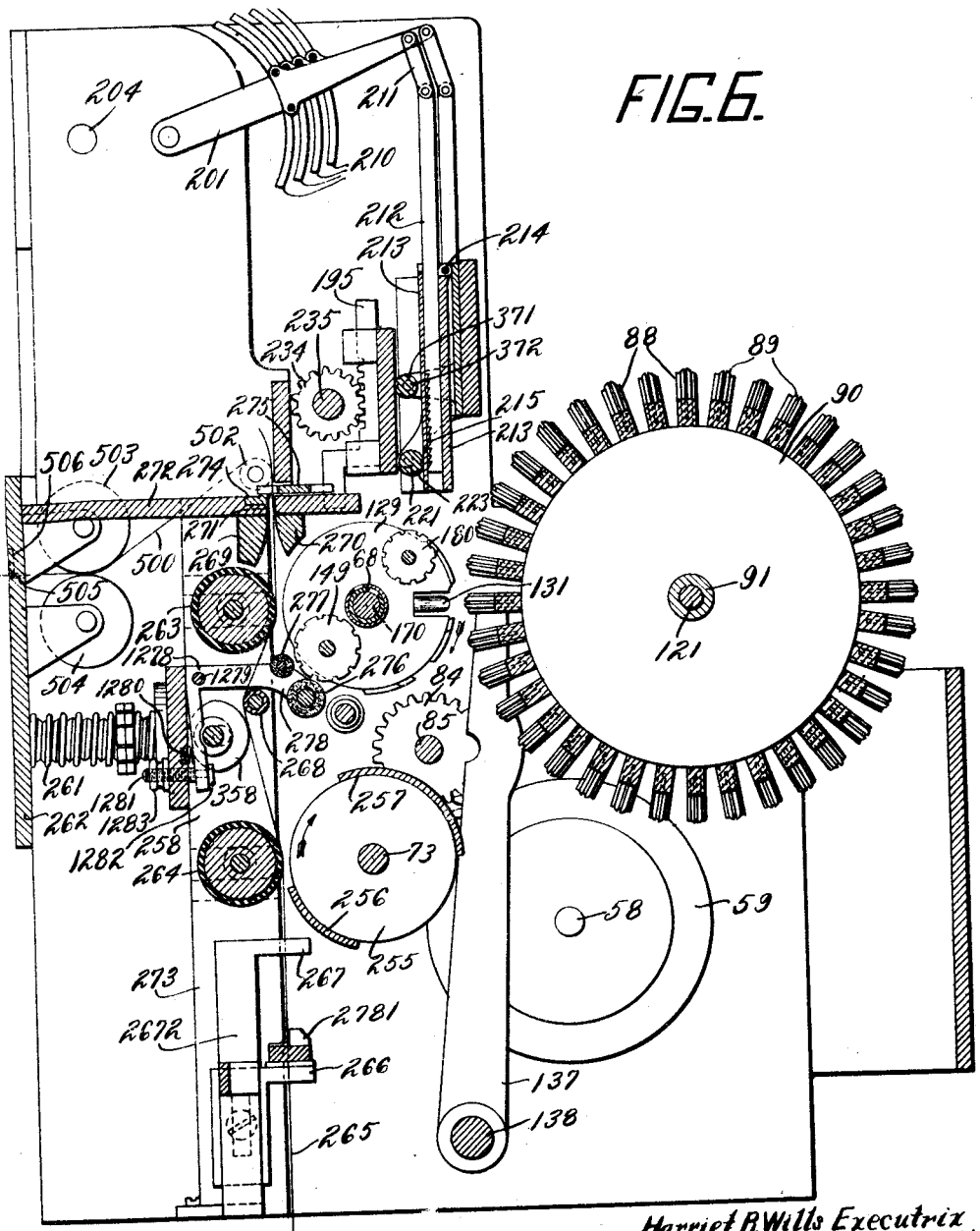

Of the said drawings: Figure 1 is a front view of the machine partly in section, the supporting means for the control devices being omitted so as clearly to present the printing mechanism to view. Fig. 2 is a right profile of the entire machine. Fig. 3 is a left profile of the entire machine. Fig. 4 is a cross section of the machine taken on the line 4—4 of Fig. 1 and looking to the right, and including the control devices and supporting means therefor. Fig. 5 is a cross section taken on the line 5—5 of Fig. 1 and looking to the right. Fig. 6 is a cross section of the machine taken on the line 6—6 of Fig. 1 and looking to the right. Fig. 7 is a cross section of the machine taken on the line 7—7 of Fig. 1 and looking to the right. Fig. 8 is a full sized partial top cross section of the machine taken on the line 8—8 of Fig. 1 and looking downward. Fig. 8ª is a full sized sectional view of a portion of the printing mechanism looking to the rear and showing the impression and inking mechanisms. Fig. 9 is a full sized detail view of the main printing device. Figs. 10, 11 and 12 are full sized detail views of sections of the main printing device appropriate to the ticket issuing section of the machine, Figs. 10 and 12 being views looking to the left and Fig. 11 a view looking to the right. Fig. 13 is a full sized cross section of the totalizing mechanism and actuators therefor. Fig. 13ª is a detail view of the totalizer transfer mechanism. Fig. 14 is a full sized top plan view of the totalizing mechanism. Fig. 15 is a full sized detail view of a part of the totalizer mechanism. Fig. 16 is a detail perspective view of the auxiliary transfer devices of the totalizing mechanism. Fig. 17 is a full sized detail view of a cam for controlling the totalizing and check severing mechanism and also of a disabling device for the totalizing mechanism with its connecting parts. Fig. 18 is a full sized detail view of a mechanism for differentially positioning the printing electros carried by the ticket printing section of the printing device. Fig. 19 is an enlarged detail view of a consecutive number printing wheel together with the alining and locking device. Figs. 20, 21, 22 and 23 are enlarged detail views of one of the control devices. Figs. 24 and 25 are enlarged perspectives of the units and tens slides respectively of the counting mechanism of a control device. Fig. 26 is full sized top plan view of a complete control device showing the adjustable consecutive number slides in adjusted position. Fig. 27 is a full sized plan view of a control device showing the printing type carried thereby and the adjusting means for the consecutive number slides. Fig. 28 is a full sized view of a preferred form of ticket issued by the disclosed embodiment of the invention. Fig. 29 is a full sized view of a portion of the audit strip used in the machine showing the detail record of tickets as issued together with an audit of the different control devices showing the number of tickets issued to each station.

As above stated no machine heretofore designed has provided for the performance of the function of keeping a record of how many tickets have been issued to each of the stations, although consecutive number counters and printing devices have been provided whereby a record is made of the number of tickets issued by the machine as a whole. This information is considered highly desirable by auditing forces of large railways and one of the purposes of the present invention is to provide an efficient mechanism for the performance of this function.

Machines have been designed which provide a plurality of control devices which are adapted to coöperate with the common printing mechanism to enable the printing of different tickets for the different stations. An improved form of control device has been shown in the present application and forms the subject matter of a copending application as hereinbefore stated. The control devices shown herein are in the form of separate means which are carried by a common supporting device. In the present embodiment of the invention the common supporting means is adjusted as a preliminary to an operation of the machine thereby insuring a proper adjustment of the desired control device relative to the printing mechanism and eliminating the necessity of a large amount of time in operating as well as eliminating complicated mechanism, for selecting a control device for use upon the operation of the machine, according to some preferred form of predetermining means.

In the prior patent hereinbefore mentioned which issued to the present inventor, there are shown a plurality of control devices which are supported by a common supporting means adjusted upon an operation of the machine. There the adjustment of the supporting means is controlled by a series of keys any one of which may be operated to predetermine the control devices which will be brought to a posititon of cooperation with the printing device upon the operation of the machine. In the present construction, however, the mechanism has been considerably simplified as above stated.

The control devices shown in the present embodiment of the invention comprise a printing slide which is adapted to print the destination on an issued ticket and also upon the audit strip. Means are also carried by different control devices for controlling the differential actuation of the totalizer mechanism. Adjustable means are carried by each of the control devices whereby a record is kept of the number of ticket issuing operations in which each control device is employed, said adjustable means forming a controlling means for the adjustable printing means carried by the printing device, whereby the consecutive number of the ticket to a certain destination is printed on the ticket and audit strip as well as the consecutive number of the machine operation. By the provision of the mechanism above described in general terms it will be seen that the general construction of the machine has been greatly simplified.

Described in detail the machine embodies the main side frames 50, 51, and 52 which are rigidly mounted on any suitable form of base. The side frames serve to support the several operating parts of the machine and particularly the operating shafts which extend across the machine. (See Figs. 1 and 2.) The motive power is applied to the machine by means of an operating crank handle 53 mounted at the right hand end of the machine on a short shaft 54 which is supported by the side frame 52 and an auxiliary support or standard 55. While the shaft 54 is shown as rotated by the operating handle 54 it will readily be seen that it may be rotated by any other form of mechanism or device such, for instance, as an electric motor or lever, as preferred. Rigidly carried by the shaft 54 is a gear 56 which meshes with a gear 57 rigidly mounted on a short shaft 58 also supported by the side frame 52 and standard 55. The shaft 58 extends a short distance inside the side frame 52 and carries a cam 59 for operating certain parts of the machine as hereinafter described. (Figs. 1 and 7.) The shaft 58 also carries a disk 60 between the side frame 52 and the standard 55 in which disk is formed a cam groove 61 coöperating with a pin 62 carried by an arm 63 pivoted at 64 to the base of the machine. The groove 61 is so formed as to provide a shoulder 65, and the pin 62 carried by the arm 63 is normally in the position shown in Fig. 1 thereby preventing an operation of the machine. The lever 63 is adapted to be rocked in a manner hereinafter described to cause the pin 62 to move to the right beyond the shoulder 65. This, it will readily be seen, will serve to unlock the machine and permit one complete rotation of the shaft 58. Upon a completion of a single rotation of the shaft 58 the formation of the groove 61 will have served to effect a restoration of the lever 63 to normal position wherein the pin 62 will engage the shoulder 65 on the completion of a single rotation of the shaft 58 thereby preventing further rotation of the shaft.

Also rigidly mounted on the shaft 54 is a mutilated gear 66 which coöperates with a companion mutilated gear 67 fast on a shaft 68 extending between the side frames 51 and 52. The purpose of the mutilated gearing is to provide an intermittent operation of the shaft 68 during the operation of the main operating shaft 54 but the gearing is so timed as to effect a complete rotation of the shaft 68 in a counter clockwise direction. The shaft 68 also carries a gear 69 which meshes with a small pinion 70 carried by a shouldered screw 71 fast to the side frame 52. The pinion 70 meshes with a gear 72 fast on the right hand end of a shaft 73 which is thus adapted to be given a single rotation in a counter clockwise direction at each operation of the machine.

The shaft 54 has fast thereon a bevel gear 74 which meshes with a similar bevel gear 75 fast on a shaft 76 (Fig. 2) extending upward and rearward at an angle and supported in a pair of bearings 77 and 78 mounted on the right hand side of the frame 52. At its upper end the shaft 76 carries a second bevel gear 79 which meshes with a bevel gear 80 loosely mounted on a stud 81 fast on the right hand side of frame 52. On its left hand end just within the side frame 52 the shaft 54 carries a pinion 82 which meshes with an intermediate pinion 83 meshing with a gear 84 fast on a rotatable shaft 85 which is thus given a single rotation at each rotation of the shaft 54. (See Figs. 1 and 7).

*Control devices.*—As shown in Figs. 2, 4, 5, 6, and 7 there are provided a plurality of control devices 88 which are detachably carried by pins 89 rigidly mounted on the periphery of a pair of disks 90 which are fast on a rotatable sleeve 91 supported between the side frames of the machine. The control devices 88 are in the form of long plates each of which is provided with a pair of holes 92 adapted to coöperate with the pins 89 to support the control devices 88 on the two supporting disks 90 (see Figs. 4, 26 and 27). It will readily be seen that when the control devices are mounted in this or any other fashion it is absolutely necessary to reduce the amount of space occupied by the control devices as much as possible. The control devices shown in the present application are therefore made very slender so that as many control devices may be arranged on the supporting means as possible.

Along one edge the main body portion of a control device 88 is formed with a groove 93 (Figs. 26 and 27) adapted to receive removable printing plates 94 and 95 bearing the destination to be printed on a ticket and audit strip respectively. As the control device 88 is to print the destination on both the issued ticket and the audit strip it is essential to have the control device of the length shown and with the two printing plates.

At the left hand end of the control devices are mounted a series of amount determining means which, in the present instance, are in the form of pins 96. As shown in Fig. 26, the pins 96 may be made of different length so as differentially to control the actuators for the totalizing mechanism in a manner hereinafter described and in accordance with the price of the tickets to the corresponding destination. While the amount determining means have been shown in the present instance in the form of the pins 96 rigidly mounted on the end of the control device 88, it will readily be seen that amount determining means might be provided in other means without departing from the spirit of the present invention. As such details of construction relative to the amount determining means form no part of the present invention it is sufficient for illustration to show the amount determining means in the form illustrated in Fig. 26.

In order to simplify the mechanism for retaining a detail record of the number of tickets which are issued of any class to any one destination it is preferable to provide in the control device, adjustable means whereby the record may be retained by the slide itself. In the form shown in the present invention the record retaining means is in the form of a step by step counter which is adapted to be advanced one step upon each ticket issuing operation of a control device. In order that the control devices may occupy as small an amount of space as possible a novel form of step by step counter has been provided in the present form of control devices whereby the entire counter may be inclosed within the bounds of the main body portion of the control device. It is therefore necessary to provide a very small form of step by step counter without in any degree lessening the efficiency of the same. The step by step counters carried by the control devices are an essential feature of the machine as a whole and in fact form a vital part thereof, as they form a basis of auditing the entire business handled by the machine.

The step by step counter shown in connection with the present invention comprises a plurality of slides 97 which are mounted to slide in grooves formed in the main body portion of the control devices. In the embodiment shown there are provided only four slides 97 the capacity of the step by step counter thereby being limited to "9999." It will readily be seen, however, that additional slides may be provided without departing from the spirit of the present invention. The slides are adapted to be adjusted by movement to the right as shown in Figs. 20, 21, 22 and 23 but are normally spring drawn to normal position by springs 98 which at their right hand end are connected to the left hand end of the slides 97, and the left hand ends of the springs are all connected to a pin 99 fast in the body portion of the control device.

Figure 20:
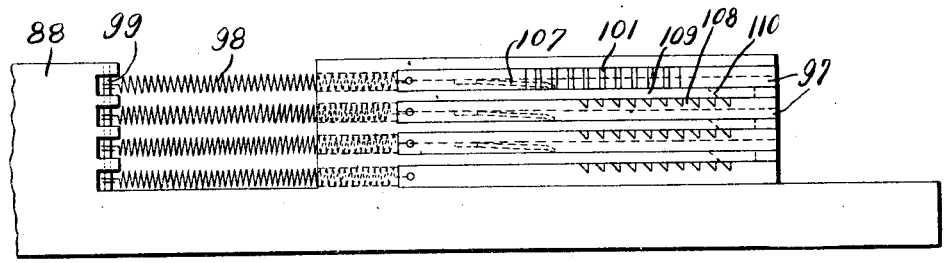
Figure 21:
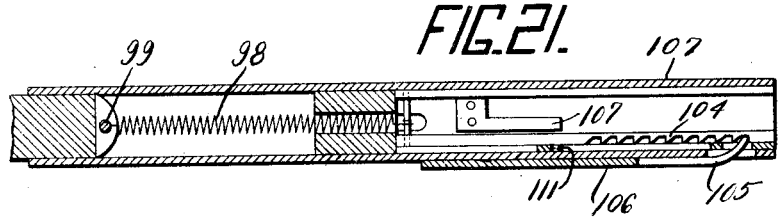
Figure 22:
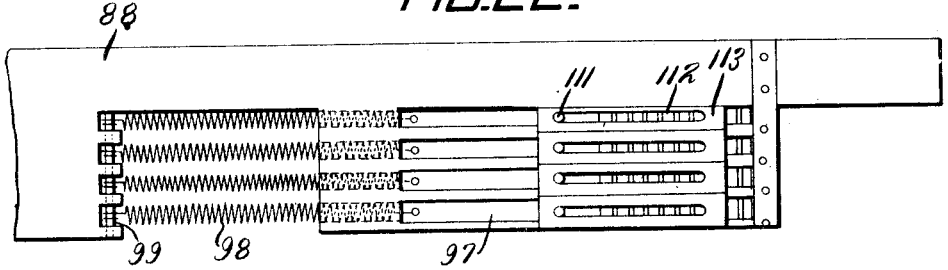
Figure 23:
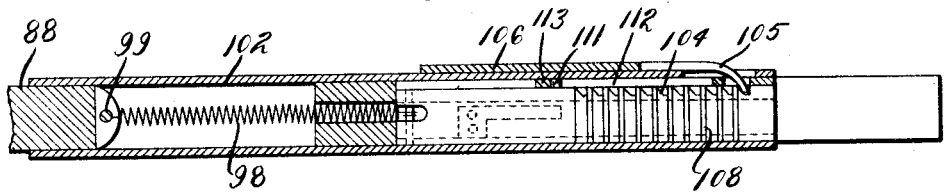

As is common in many forms of step by step counters the operating movement is given merely to the units element which in the present instance is in the form of the units slide which is the upper one shown in Fig. 20 and is shown in perspective in Fig. 24. All of the slides normally stand in the zero position shown in said figure and transfer mechanism is provided whereby upon the tenth step of movement of the units slide a single unit of movement is transmitted to the second or tens slide and the units slide is allowed to spring back to normal zero position. The units slide is operated upon each ticket issuing operation of the machine which involves the particular controller by an operating finger 100 (Fig. 27) which will be hereinafter more particularly described. As shown in Fig. 26, the slides 97 and all coöperating parts are inclosed in the shell casing 102 so as to protect the parts. The finger 100 coöperates with ratchet teeth 101 formed on the top of the units slides as shown in Figs. 9, 20 and 24. Upon each ticket issuing operation of the machine the operating finger 100 is effective to pass through the opening 103 formed in the casing 102, of the control device brought into operative position and impart a single step of movement to the units slide.

In order to retain the slides in adjusted position, each of the same is formed on its under side with ratchet teeth 104 coöperating with a plurality of spring fingers 105 formed on a spring plate 106 carried by the casing 102. It will readily be seen that the fingers 105 will hold the slides in adjusted position.

The mechanism providing for the carrying of a single unit from the units slide to the tens slide upon a completion of ten steps of movement of the units slide, comprises a spring finger 107 carried by the units slide and adapted to coöperate with ratchet teeth 108 formed on the adjacent side of the tens slide. It may be here stated that the transfer mechanism between the units and tens slide is identical with that employed between the tens and hundreds and the hundreds and thousands slides and the description of a transfer from the units to the tens will suffice. While as hereinbefore stated the spring 107 is adapted to coöperate with the ratchet teeth 108 formed on the tens slide, the coöperation is prevented, by a wall 109 formed on the body portion 88 of the control device and extending between the slides. There is provided in the wall 109 an opening 110, which when the units slide has reached its ninth position of adjustment, will permit the spring finger 107 to pass down through the opening to engage the ratchet 108. It will therefore readily be seen that upon the tenth step of movement of the units slide the spring finger 107 will engage and move the tens slide one step in which position it will be held by its appropriate spring finger 105.

Upon completion of the tenth step of movement of the units slide it is necessary to provide means to disable the spring finger 105 appropriate thereto. Means for performing this function comprise the following construction, which is identical for all slides. On its under side each of the slides carries a pin 111 which projects into an elongated slot 112 of a sliding plate 113. In the normal position of the slides the plates 113 are held in the position shown in Figs. 21 and 22 by reason of the engagement of the pins 111 with the left hand ends of the elongated slots 112. When a slide is adjusted to the ninth position, however, the pin 111 will be carried to the right until it engages the right hand end of the elongated slot 112 of its appropriate plate 113. It will therefore readily be seen that upon the tenth step of movement of said slide the pin 111 will cause a sliding movement of its plate 113 to the right to cause the right hand end of said plate to pass beneath the right hand end of the appropriate spring finger 105 (Figs. 21 and 23) thereby forcing the same out of engagement with the ratchet teeth 104. As soon as the finger 105 is forced out of engagement with ratchet teeth 104 the appropriate spring 98 will become effective to restore the slide to normal zero position. As soon as the slide nears the normal zero position the pin 111 will again engage the left hand end of the slot 112 of the moved plate 113 and during the last step of restoring movement of the slide the plate 113 will be carried back to normal position thereby withdrawing the right hand end thereof from beneath the spring finger 105 and permit the same again to move to a position wherein it will coöperate with the ratchet teeth 104.

The slides in the form shown are adapted to coöperate with a series of sliding plates 114 Figs. 8 and 27, one of which is provided for each of the number slides 97, in the present instance four which are formed on their lower ends with graduations 115 adapted to coöperate with the right hand ends of the slides 97 which, when adjusted, will serve differentially to control the positioning of the slides 114 for the purpose hereinafter described.

*Control slides supporting means and station setting mechanism.*—As hereinbefore stated, all the control devices are formed with a pair of holes 92 which are adapted to coöperate with the pins 89 carried by the pair of supporting disks 90. The pins 89 are split at their outer ends and slightly spread so as to form a yielding support for the control slides as they when selected are adapted in the operation of the machine to be removed temporarily from the common supporting means in order to coöperate with the printing devices hereinafter described for the purpose of making a printed record on the issued ticket, and audit strip contained within the machine. The disks 90 which carry the supporting pins 89 are as hereinbefore stated fast on the sleeve 91 which is supported between the side frames of the machine.

Fast on the left hand end of the sleeve 91 (see Fig. 3) is an arm 116 which has pivotally mounted thereon at 116² an adjusting lever 117 which carries a knob 118 at its outer end, loose on the outer end of a pin 119 projecting through the arm 117 toward the frame 50. The pin 119 is tapered on its inner end and is adapted to coöperate with a plurality of alining holes 120 formed in the said frame 50 of the machine. The holes 120 and pin 119 are provided for the purpose of holding the lever 117 and its connected parts in adjusted position.

The inner end of the lever 117 is pivotally connected to a sliding shaft 121 which is adapted to slide inside of the sleeve 91. The shaft 121 extends entirely across the machine and on its right hand end carries a small disk 122 provided with an annular groove, into which project pins 123 carried by a Y-shaped arm 124 fast on a short rock shaft 125. When the lever 117 is rocked about its pivot to disengage the pin 119 carried thereby from any one of the holes 120 the shaft 121 will slide to the right thereby rocking the shaft 125 in a clockwise direction looking from the front and against the tension of a coil spring 126¹ which surrounds the shaft 125 and has one end fast to the arm 124 and the other to the frame of the machine. Fast on the shaft 125 is a downwardly extending arm 126 which carries at its lower end a rearwardly extending spring finger 127 which is adapted to cooperate with a bevel stud 128 fast on the upper end of the lever 63. In the normal position of the parts the spring finger 127 stands to the right of the bevel lug 128 when the pin 62 is in the locking position shown in Figs. 1 and 2. When, as above stated, the lever 117 is rocked to disengage the pin 119 from one of the holes 120 and the shaft 125 is rocked in a clockwise direction, it will cause the spring finger 127 to move to the left. During this movement of the spring finger 127 to the left it will snap over the bevel lug 128 and stand to the left of said lug during the time that the lever 117 is held in rocked position. As soon, however, as the lever 117 and arm 116 is moved to one of its positions of adjustment and the pin 119 is permitted to pass into the hole 120 appropriate to said position, the shaft 125 will be allowed to move in a counter-clockwise direction under the action of a spring 1261 thereby moving the lower end of the arm 126 and the spring finger 127 carried thereby to the right. During the movement of the spring finger 127 to the right it will engage the lug 128 carried by the lever 63 and thereby rock the said lever 63 about its pivotal support 64. This movement of the lever 63 will cause the pin 62 to pass to the right beyond the locking shoulder 65 formed in the disk 60 thereby unlocking the machine to permit of an operation of the operating shaft 54. The drum 126 is adapted to be given sufficient movement to cause the spring 127 to snap over the lug 128 after the pin 62 has been moved to unlocking position so as to assume its normal position to the right of the lug. Upon an operation of the machine the pin 62 will be moved back to normal locking position as hereinbefore described by the cam groove 61.

As shown in Fig. 3, the lever 117 is adapted to move relative to a scale which is provided on the left hand side frame 50 of the machine. It will be noted that the scale is divided into three main sections marked "Full fare", "Half fare", and "Excursion", and that the same destinations are repeated in the three sections. The purpose of providing the form of scale shown is to enable a proper record to be made of the amount of money which is to be taken in for the tickets issued. It will readily be seen that if one of the control slides is provided with the amount determining fingers 96 that said control device will effect the registration of a determined amount in the manner hereinafter described. This would be satisfactory in case only tickets of a certain class are to be issued. However, it is often desired to issue "half fare" tickets as well as "excursion" tickets and as the amounts of money to be paid for those tickets vary from the amount of the "full fare" ticket, it has been found desirable to provide a plurality of control devices for each destination, in the present instance three. Each of these control devices will, as it will readily be understood, carry its independent step by step counter thereby maintaining a record of the number of tickets of each class which are issued to the one destination. Each of the three control devices for a destination will carry amount determining means or fingers 96 which may be set differently according to the class thereby differentially controlling the totalizing mechanism.

If it is desired to issue a "full fare" ticket to the station "Piqua", as indicated on the scale shown in Fig. 3, it will be necessary to rock the lever 117 about its pivot by grasping the knob 118 and pulling the same to the left to withdraw the alining pin 119 from the hole in which it is shown as extending. The lever will then be moved in a counter clockwise direction until it stands over the station name "Piqua", when the knob 118 will be released to permit the alining pin 119 to enter the hole 120 appropriate to the station "Piqua". The pin 119 may be beveled so that in case the lever 117 is not brought to an absolute position of adjustment it will be moved to proper position when the pin 119 is forced to enter the hole 120 under the action of the spring 1261. When the lever 119 is so adjusted it will effect the release of the locking device for the main operating mechanism thereby permitting an operation of the same.

*Carrying mechanism for control slides.*— The purpose of adjusting the supporting means for the plurality of control devices is to establish a coöperative relation between the selected control devices and the printing device. The printing device in the present embodiment is in the form of a rotating drum which is given a single rotating movement at each operation of the main operating mechanism. In the normal position of the printing drum a pair of pins 131 carried by the end walls of the drum are in a position to receive the selected control device. When any one of the control devices is brought to adjusted position the pins 89 supporting the same will be brought into direct alinement with the pins 131 which are so spaced that upon the operation of the main operating mechanism the selected control device will be permitted to be carried from its pins 89 on the supporting means, to the pins 131 of the printing device. The means for so carrying the selected control device from its normal supporting means to the pins 131 of the printing device comprise the following mechanism: Mounted adjacent the printing device and in position normally to coöperate with the extremities of a positioned control device are a pair of sliding jaws 132 and 133 which are suitably mounted respectively on guide pins 134 in an opening 1341 in the frame 51 and on guide 135 projecting from frame 52, to slide from front to rear of the machine relative to the common supporting means for the control devices and the printing device. (See Figs. 1, 4 and 7). When any one of control devices is brought to adjusted position its extremities will pass into the jaws 132 and 133 and on the operation of the machine the jaws will be moved rearward so as to carry the position control device from its supporting fingers 89 to the pins 131 of the printing device.

Pivotally mounted respectively to the sliding jaws 132 and 133 are a pair of arms 136 and 137 rigidly mounted at their lower ends to a rock shaft 138 supported by the frames 51 and 52. The arm 137 carries an anti-friction roller 139 (Fig. 7) which is adapted to coöperate with the cam 59 hereinbefore referred to and fast to the shaft 58. The cam 59 is so formed as to rock said arms 136 and 137 rearward immediately upon the beginning of the operation of the main operating mechanism whereby the positioned control device will be carried from the supporting means to the printing device in the manner above described. The arms 136 and 137 will remain in moved position until near the end of the operation of the machine when the printing device will have been given a single rotation and the control device will again be in coöperative relation with the jaws 132 and 133. The arms 136 and 137 will then be rocked back to normal position by the cam 59 thereby effecting the removal of the control device from the printing device and the restoration of the same to its proper position on the supporting means for the control devices.

*Printing device.*—The drum of the printing device includes a pair of disks 129 and 130 fast on the shaft 68 and carrying the pins 131. The disks 129 and 130 are formed with cut away portions 140 in which the pins 131 are mounted and in which the positioned control device is adapted to pass when transferred from the supporting means to the printing device.

*Ticket consecutive number printer.*—Slidably mounted on the disk 129 is a plate 141 which is provided with an L-shaped slot surrounding a small shaft 142, (Fig. 10). The plate 141 is normally drawn forward by a spring 143 and is held in upper position shown in Fig. 10 by a leaf spring 144. The plate 141 is formed with a flange 145 which is adapted to coöperate with a small cam 146 fast on the shaft 142 for a purpose hereinafter described. When the machine is in condition for issuing tickets the plate 141 will be in the position shown in Fig. 10 with its forward end 1146 projecting in the cut away portion 140. In this position it will be in the path of movement of a selected control device 88 when the latter is carried from the supporting means to the printing device. It will thus be seen that when a control device is carried from the supporting means to the printing devices the control device will engage the forward end 1146 of the plate 141 thereby moving said plate rearwardly against the tension of spring 143. The plate 141 is provided with a rearwardly extending finger 147 which is adapted to coöperate with a ratchet wheel 148 fast on the side of the units wheel 149 of a ticket consecutive number printing device.

The consecutive number device may be of any well known step-by-step counter construction, such, for instance, as the well known form of counter known on the market as the " Veeder " counter. In that type of step-by-step counter there are provided a plurality of reading printing wheels, the units wheel of which is adapted to be given a single step of movement at a time and upon the completion of rotation of said units wheel a single unit will be transferred to the wheel of next higher order. Such forms of step-by-step counter are, as above stated, well known in the art, and form no part of the present invention. There are provided a plurality of spring fingers 150 mounted fast on a sleeve 1151 forming a tie between the disks 129 and 130 surrounding the shaft 68, which fingers coöperate with the ratchet wheels 148 to prevent any retrograde movement of the printing wheels.

The printing device just described is for the purpose of printing a consecutive number of tickets issued by the machine. As it is also desired to print the consecutive number of each detail transaction on the audit strip a second consecutive number printing device 1491 is provided. The operation of the second consecutive number printing device is exactly the same as the device just above described and is located between the disk 130 hereinbefore referred to and a second disk 151 also fast on the shaft 68. The mechanism for operating the second consecutive number printing device is substantially the same as that for operating the device above described and comprises a sliding plate 152 similar in construction to the plate 141. The plate 152 is mounted to slide on a shaft 153 and is formed with a flange 154 which is adapted to coöperate with a small cam 155 fast on the shaft 153. The plate 152 is held in the forward position by a spring 156 and is held in the upper position shown in Fig. 11 by a leaf spring 157.

Whenever it is desired to use the machine in auditing the business handled by the same, it is of course not desired to operate the consecutive number devices just above described. Means are therefore provided which are controlled by a special audit lever hereinafter to be described, which will disable the operating devices for the consecutive number printing device. The cams 146 and 155 on the shafts 142 and 153 respectively hereinabove referred to are the means which are rendered effective for disabling plates 141 and 153. Fast on the short shaft 153 is a pinion 158 (Fig. 12) which is constantly in mesh with an internal gear 159 formed on a flange carried by a disk 160. Whenever the audit lever is operated the disk 160 is adapted to be given a slight rocking movement through connections hereinafter to be described and this rocking movement will effect a slight rotation of the pinion 158 and shaft 153 thereby giving a slight rotation to the cam 155. The cam 155 through its coöperation with the flange 154 will cause the plate 152 to be moved downward against the action of the spring 157 thereby withdrawing the forward end of the plate 152 from the path of a selected control device 88. Also fast on the shaft 153 is a second pinion 161 (Fig. 11) constantly in mesh with a segment gear 162 fast on a short shaft 163 supported by the disks 130 and 151. On the left hand end of the shaft 163 (Fig. 9) is mounted a similar segment gear 164 which is constantly in mesh with the pinion 165 fast on the right hand end of the shaft 142. Through the connections just described any rocking movement of the shaft 153 and cam 155 will be transmitted to the cam 146 which will then become effective to rock the plate 141 downward against the action of the spring 144 to withdraw the forward end 1146 of said plate from the path of the positioned control device 88. In this way both of the consecutive number printing devices are prevented from being operated by the selected control device when the machine is being operated in auditing operations.

*Adjustable electros for printing device.*— Whenever the supporting means for the control devices 88 is adjusted to any of its positions the printing device is adapted to print on the issued check the necessary data indicating whether the ticket represents a "full fare," "half fare" or "excursion" rate in addition to the data printed thereon by the selected control device. As shown in Fig. 1, and as hereinbefore described, the scale on the left hand end of the machine is divided into three main sections representing the three classifications of tickets just above mentioned and the control devices are divided into three groups representing the same classification, each destination being represented by a control device in each group. In order to provide for the printing of the proper data on the issued check according to the group to which the selected control device belongs, the printing device is provided with a plurality of adjustable electros any one of which may be brought to printing line. In the present instance, as there are three groups of control devices there are provided three adjustable electros 164, 165 and 166. (Fig. 5.) The printing faces of the electros 164, 165 and 166 are curved to conform to the curvature of the disks 129 and 130. The printing position of an electro is that of electro 164 shown in full in Fig. 9 and also in Fig. 5. When an adjusted electro is in the position shown in said figures it rests on a raised portion 167, shown in dotted lines in Fig. 5, formed on the peripheries of the disks 129 and 130. The electro 164 is shown in Fig. 5 as resting on the raised portion 167 of the periphery 129, and it will be seen that the portion 167 is of slightly greater radius than the remaining portion of the periphery of the said disks. The raised portions 167 of the peripheries of the disks hold the adjusted electro in printing line so that it alone will effect the printing of the data borne by the same.

The electros 164, 165 and 166 (Figs. 5 and 18) are radially slidable relative to the disks 129 and 130 and are mounted on arms formed on the spiders 168 and 1681 fast on sleeves 169 and 1691. The sleeves 169 and 1691 surround the shaft 68 respectively at the left of disk 129 and at the right of disk 130 and as shown in said figures, the shaft 68 is drilled at the left hand end which end supports the disks 129 and 130, to form a sleeve surrounding a sliding shaft 170. At its left hand end the shaft 170 carries a pair of collars 1701 which conform to a peripheral groove 171 shown in Figs. 4, 9 and 18. Projecting into the groove 171 is a pin 172 carried by the upper end of an arm 175 fast on a rock shaft 174 (Fig. 4). Also fast on the shaft 174 is an arm 175 pivoted at its upper end at 176 to a link 177, pivoted to the lower end of an arm 178, pivoted at 179 to a disk 180 which is rigidly mounted on the frame 51. Carried at the lower end of the arm 178 is a roller 181 which is adapted to bear against camming flanges 181ª formed on the left hand disk 90 of the supporting means for the control devices. The roller 181 is held in contact with the camming flanges by the action of a spring 182 surrounding the shaft 174, and having one end fast to the frame of the machine and the other bearing against a screw pin 183 carried by the arm 175. The camming flange which coöperates with the roller 181 is formed in varying widths and upon the adjustment of the disk 90 in positioning a selected control device the flanges will coöperate with the said roller and its operating connections to rock the shaft 174 differentially. In the position of the supporting means for the control devices representing "full fares" the roller 181 will be in a position coöperating with the camming flange of least width, or if preferred directly bearing on the face of the disk 90 as shown in the drawings. As soon, however, as it is moved to the position representing "excursions" the camming flange of next greater width will engage the roller 181 to rock the shaft 174 slightly. Upon the rocking of the shaft 174 the upper end of the arm 173 fast thereon will be moved to the left thereby drawing the shaft 170 to the left.

Mounted on the shaft 170 are a pair of anti-friction rollers 1183 (see Figs. 5, 9 and 18). The rollers 1183 project through a longitudinal slot 184 formed in that portion of the shaft 68 which is drilled to form a sleeve. The rollers 1183 project radially beyond said slot and into spiral slots cut in the sleeves 169 and 1691 carrying the electro spiders. When the shaft 170 is drawn to the left, the rollers 1183 will coöperate with the spiral slots formed in the sleeves 169 and 1691 and will effect a rotation of said sleeves 169 and 1691, in a counter clockwise direction (Fig. 5) and a consequent rotation of the spiders 168 and 1681 carrying the electros 164, 165 and 166. The electros 164, 165 and 166 are normally spring drawn toward the center of the disks 129 and 130, thereby holding the electros in contact with the peripheries of said disks. Adjacent the portions of enlarged radius 167 of the disks 129 and 130 are small rollers 185 one carried by each of said disks 129 and 130, the purpose of which rollers is slightly to raise the electros as they pass above the printing point when being adjusted to avoid interference with a plurality of number printing wheels to be hereinafter described. When the sleeves 169 and 1691 are rotated in the manner just described, that is upon moving the control device support from "full fare" to the "excursion" zone the spider will be moved in a counter-clockwise direction as shown in Fig. 5 thereby withdrawing the electro 164 from the raised portions 167 of the peripheries of the disks 129 and 130 and will bring the second electro 165 to printing line. If, however, the adjustment of the supporting means is to bring one of the "half fare" control devices into coöperative relation with the printing device, the camming flange of greatest width will engage the roller 181 to give the shaft 174 its greatest possible extent of rocking movement. This will draw the shaft 170 to the left as far as it can move thereby through rollers 1183 and spiral slots giving the sleeves a movement in excess of that just above described, whereby to bring the electro 166 to printing position. If then the machine is operated with the spiders in either of the last mentioned positions the "full fare" electros will not print but the particular electro carried by the adjustment to the printing point on the disks 129 and 130 and over the raised portions 167 of said disks will print.

*Control device consecutive number printer.*—Adjacent the raised portion 167 of the periphery of the disk 129 is a set of number printing wheels 186 (Figs. 9 and 10) which are rotatably mounted on a shaft 187 supported by the disks 129 and 130. One of the wheels 186 is shown in detail in Fig. 19. Each of the wheels 186 is formed with a ratchet wheel 188 which coöperates with a bell crank pawl 189 loosely pivoted on a shaft 190 and normally engaging the ratchet 188 under the action of a spring 191. The wheels 186 are normally spring drawn toward normal zero position by a short clock spring 192, one end of which is fast to a pin 193 carried by the wheel 186, and the other end is fast to a pin carried on the upper end of an arm 194 fast on the shaft 190. The movement of the wheel to normal zero position is, however, prevented by the bell crank locking pawl 189. At each operation of the machine an arm 195 (see Fig. 10), is moved downward and engages the bevel upper end of a bell crank 196 pivoted on a shaft 197 supported by the disks 129 and 130. The forwardly extending arm of the bell crank 196 projects over the rearwardly extending arms of the bell crank locking pawls 189. When engaged by the arm 195 the bell crank 196 will be rocked in a counter-clockwise direction about the shaft 197 (Fig. 10) thereby engaging and rocking the bell crank locking pawls 189 out of engagement with the ratchets 188 of the wheels 186 thereby permitting restoring movement of the wheels 186, under action of their springs 192.

The wheels 186 are adapted to be adjusted to a position commensurate to the adjustment of the slides 97 of a selected control device. The means for adjusting these consecutive number printing wheels 186 from the slides 97 comprises the following mechanism: The slides 114 hereinbefore referred to as being formed with the graduations 115 and adapted to coöperate with the right hand ends of the slides 97, are mounted to slide in a frame 198, (see Figs. 7 & 8). At their upper ends the slides 114 are pivotally connected to links 199 which in turn are pivotally connected to forwardly extending arms 200 carried by a series of pivoted yokes 201. The yokes 201 are normally held in upper position shown in Fig. 7 by a roller 202 extending laterally beneath all of the yokes 201. The roller 202 is carried by the forward end of an arm 203 fast on a rock shaft 204. Fast on the outer right hand end of the rock shaft 204 is a bell crank 205 (Fig. 2) the forwardly extending arm 206 of which carries an antifriction roller 207 adapted to coöperate with a cam groove 208 formed in a cam 209. The cam 209 is loosely mounted on the stud 81 on the side frame 52 and is fast to the bevel gear 80 hereinbefore referred to. The bevel gear 80 and cam 209 are adapted to be given a single complete rotation at each operation of the machine, through the medium of the operating connections hereinbefore described.

The groove 208 of the cam 209 is so formed as to effect a counter-clockwise movement (Fig. 2) of shaft 204 and a consequent downward movement of the roller 202 just after the selected control device has been transferred to the printing device. As soon as the roller 202 moves downward the yokes 201 are free to move downward and are driven downward under the action of weighted members or gravity devices 210 forming the cross bars of yokes. When the yokes move down in the manner just described, the slides 114 move downward until some one of the graduations 115 formed thereon will engage the right hand ends of the slides 97 of the control device. As soon as the appropriate graduations engage the slides 97 the yokes will be arrested in their movement.

Pivotally mounted at the left hand end of the cross bars 210 of the yokes are a series of links 211 which are pivotally connected to downwardly extending racks 212 which are mounted to slide in a frame 213 pivotally mounted at 214 to the frame of the machine. The racks 212 are formed with teeth 215 adapted to coöperate with the ratchet wheels 188 on the consecutive number printing wheels 186. The downward movement of the racks 212 will, of course, through the connections just described, correspond to the differential downward movement of the slides 114 and the wheels 186 will be adjusted to an extent corresponding to the position of adjustment of the slides 97.

As soon as the downward movement of the yokes 202 has been completed the lower end of the frame 213 is rocked forwardly about its pivot 214 to disengage the rack teeth on the racks 212 from the ratchets 188. The rocking movement of the frame 213 is effected in the following manner (Figs. 7 and 8). Fast on the shaft 204 is a downwardly extending arm 216 carrying a pin 217 at its lower end, which pin projects into an elongated slot 218 formed in the rear end of a link 219, the forward end of which is pivotally connected to an arm 220 fast on a short rock shaft 221 carried by hangers 222 mounted on the frame of the machine. The shaft 221 carries near its left end an eccentric 223 for moving the frame 213. When the shaft 204 is rocked to its full extent to carry the yoke 202 to its lowermost position, the lower end of the arm 216 will be rocked rearwardly and as it reaches its rearmost position the pin 217 will engage the rear wall of the slot 218 and thereby move the link 219 rearwardly. This movement of the link 219 rearwardly will effect a rocking movement of the shaft 221 through the medium of the arm 220. When the shaft 221 is so rocked the portion of the eccentric 223 of largest radius will engage the rear wall of the frame 213 and rock the said frame forwardly about its pivot 214 thereby disengaging the rack teeth 215 from the ratchets 188. The cam 209 will then become effective to rock the shaft 204 to carry the roller 202 back to normal position. When the roller 202 is so moved it will engage all of the yokes 201 which are then out of normal position and carry the same back to normal position. This will, of course, restore the slides 114 and racks 212 to normal position, and as soon as the racks 212 reach normal position the pin 217 will engage the forward wall of the slot 218 and move the link 219 forwardly, thereby rocking the shaft 221 to permit the portion of the eccentric 223 of smallest radius to move into coöperation with the frame 213, thereby permitting the rocking movement of the said frame back to normal position, under the influence of a spring 2131 interposed between the frame 213 and a part of the frame of the machine (see Fig. 5).

When the wheels 186 are rotated by the racks 212 they are held in adjusted position by the bell crank locking pawls 189 hereinabove referred to. Upon the operation of the printing device the number represented by the position of adjustment of the slides 97 of the adjusted control device will be printed by the printing wheels 186 on the check.

In order to print the same number on the audit strip, there is provided a second set of consecutive number printing wheels 224. The wheels 224 are constructed in exactly the same manner as the wheels 186 and are provided with similarly constructed bell crank locking pawls 189. A detailed description of the consecutive number printing wheels 224 is therefore thought to be unnecessary. There is also provided an arm 225 similar to the arm 195 which will become effective immediately upon the beginning of the operation of the machine to release any of the wheels 224 which were previously adjusted. The wheels 224 are adapted to be adjusted by a set of racks 226 which are substantial duplicates of the racks 212. The racks 226 are mounted to slide in a frame 227 which is also pivoted near its upper end and is adapted to be rocked at each operation of the machine to throw the racks 226 into and out of engagement with the ratchets of the consecutive number printing wheels 224. The rocking of the frame 227 is effected by an eccentric 228 fast on a shaft 229 which is adapted to be rocked by the bell crank 205 through the medium of an arm 230 (Fig. 2), link 231 and pin 232 carried by the downwardly extending arm 233 of the bell crank 205 above mentioned. The bell crank 205, as will be remembered, is fast to the rock shaft 204 and the operation of the connections just referred to is exactly like that of the connections for rocking the eccentric 223, and no further description of the same is thought to be necessary at this point.

The means for operating the arms 195 and 225 immediately upon the beginning of an operation of the machine to disable the latching means for the consecutive number wheels 149 and 224, will now be described. The arms 195 and 225 are each formed with rack teeth adapted to mesh with pinions 234 and 235 respectively (Fig. 8), which gears are fast on a rock shaft 236 supported by the frames 51 and 52. The rock shaft 236 is normally held in a position in which the arms 195 and 225 will be held elevated, by a coil spring 237 surrounding the left hand end of the shaft 236 and having one end fast to the frame 51 at 238 and the other end fast to the shaft 236 at 239. Mounted on the right hand end of the shaft 236 is a small disk 240 (Fig. 2) carrying a pin 241 which is adapted to be engaged by a lug 242 carried by a disk 243 fast on the shaft 76 which, as hereinbefore described, is given a single rotation at each operation of the machine. The disks 240 and 243 are relatively positioned on their respective shafts so that immediately upon the beginning of an operation of the machine the lug 242 will engage pin 241 and rock the shaft 236 to a slight extent in a counter-clockwise direction until the lug 242 passes the pin 241, when the shaft 236 will be restored to normal position by the spring 237.

When the shaft 236 is rocked in a counter-clockwise direction the arms 195 and 225 will be driven downward through the medium of the gears 234 and 235. As soon as the arms 195 and 225 are driven downward they will, by moving bell crank 196 for the wheels 186 and a similar one for wheels 224, disengage the latching pawls from the wheels of the consecutive number devices 186 and 224, whereby the wheels of said devices will be permitted to move to normal zero position under the action of their restoring springs hereinbefore referred to. This it will be seen will destroy the adjustment of the wheels of a previous operation and the timing of the operating parts is such that the restoration of the consecutive number printing devices 149 and 224 to normal zero position will be effected before the yokes 201 and the slides 114, 212 and 226 will begin their downward movement.

Slidably mounted on the shaft 236 (Fig. 8) is a gear 244 which in its normal position, when the machine is adjusted to issue tickets, will mesh with teeth formed on a sliding arm 245 (see Figs. 7, 8 and 9). The arm 245 is located just above a sliding plate 246 (Fig. 9) mounted to slide in a frame 247 carried by a sleeve 248 fast on the shaft 68. The plate 246 is normally held in elevated position by a spring 249 interposed between the lower end of said plate 246 and a cut away portion 250 in the collar 248. Pivotally mounted at 251 to the plate 246 is an actuating pawl 252 which is normally held in the position shown in Fig. 9 by a spring 253. When a selected control device is carried from the common supporting means to the printing device, the opening 103 formed in its shell 102 which incloses the consecutive number slides 97 and their coöperating parts, will be immediately beneath the operating end of the pawl 252.

The means for rocking the shaft 236 is so timed that the rocking movement of said shaft will be effected immediately after the preliminary selected control device has been transferred to the printing device. As soon then as the shaft 236 is rocked the arm 245 will be driven downward and will engage the plate 246 and force the same downward against the action of the spring 249. This will cause the right hand end of the pawl 252 to engage one of the teeth 101 formed on the pawl units slide 97, and as the pivot of the pawl is carried downward by the plate 246, will then rock in a counter-clockwise direction about the pivot 251, to effect the movement of the units slide the distance of one tooth to the right thereby adding one on the step-by-step counter. The arm 245 will then be immediately withdrawn when the shaft 236 is restored under the action of its restoring spring 237 as hereinabove described. When the arm 245 is withdrawn the springs 249 and 253 will, of course, become effective to restore the sliding plate 246 and the pawl 252 carried thereby to normal upper position out of engagement with the units slide 97 of the control device.

In order to prevent any sagging of the right hand end of the selected control device during the time that the units slide is being adjusted by the mechanism just above described, the collar 248 is formed with a forwardly projecting lug 254 which is adapted to support the right hand end of the selected control device after it has been inserted in the printing device.

The purpose of slidingly mounting the gear 244 on the shaft 236 is to permit of a disengagement of the gear 244 with the rack 245 during an auditing operation when no adjustment of the slides 97 is to be effected. The means for disengaging the gear 244 from the rack formed on the arm 245 will be hereinafter described.

*Ticket printing device — Impression means.*—The means for taking an impression from the printing device and from the selected control device inserted therein will now be described.

Referring to Figs. 5 and 6, it will be noted that immediately beneath the printing device hereinabove described there is located an auxiliary printing device 255 fast on the shaft 73 which is given a rotation at each operation of the machine, as hereinbefore stated. The purpose of providing the auxiliary printing device 255 is to provide for additional electros 256 and 257 for printing additional information on the issued tickets, such as the statement of the company issuing the ticket together with the conditions on which the ticket is held. It will readily be seen that this will relieve the main printing device and will also avoid mechanical complication as considerable amount of space on the periphery of the main printing device is consumed by the several consecutive number printing devices and their operating means and also by the adjustable electros 164, 165 and 166. The electros 256 and 257 carried by the printing device 255 may be arranged to contain any desired information and may be made in removable form so as to permit the change of an electro at any time as desired. This, of course, forms no part of the present invention and no specific form of electro will be shown or described herein.

Adjacent the main printing device and auxiliary printing device at their rear is a sliding frame 258 mounted to slide forward and rearward in upper and lower ways 259 and 260 in the frame 51 and 52 in upper and lower ways 259¹ and 260¹ in an auxiliary frame 105¹ in the rear of the machine (Fig. 8ª). The frame 258 is normally forced forward and held in position to coöperate with the main and auxiliary printing devices by a spring 261 which is interposed between the rear part of the sliding frame 258 and a plate 262 which extends across the back of the machine and connects the side frames 50, 51 and 52. Carried by the frame 258 are a pair of impression rolls 263 and 264 which are adapted to coöperate with the main printing device and auxiliary printing device respectively. The frame 258 carrying the impression rolls 263 and 264 is made in sliding form so as to permit of the withdrawal of said impression means from coöperative relation with the main printing device and auxiliary printing device during an auditing operation when no ticket is to be issued. This withdrawal of the impression means 263 and 264 is effected in a manner hereinafter described.

A check strip 265 (Fig. 5) from which the printed tickets are severed, is adapted to be fed from a supply roll (not shown) through guides 266 and 267 carried by an auxiliary frame 267² supported on the base of the machine. The check strip 265 then passes to the right of the impression roll 264 as shown in Fig. 6, and then passes upward behind a guiding roller 268 carried by frame 258 for the purpose of holding the check away from inking means to be hereinafter described, and then passes in front of the impression roll 263 and thence between guiding plates 269 and 270 and through a slot 271 formed in the plate 272 supported by the frame 51 and the auxiliary support 273. The plate 272 carries adjacent the slot 271 a stationary blade 274 which is adapted to coöperate with a pivotally movable blade 275 to sever a printed check in a manner hereinafter described.

As the check strip 265 is interposed between the impression means 263 and 264 and the main and auxiliary printing devices it will readily be seen that upon the rotation of said printing devices the check strip will be fed upward. It also will be seen that if means were not provided for partially withdrawing the strip after a ticket has been severed there would be a large amount of waste material on the end of each ticket and hence there is provided a gravity tension device 278¹ which automatically withdraws the strip upon the severing of the ticket a sufficient distance to permit the extremity of the strip to be engaged by the main printing device upon the next operation of the machine. The tension device 278¹ is described and shown in detail in the hereinbefore mentioned Letters Patent issued to the present inventor, and as it forms no part of the present invention no detailed description of its operation or purpose will be herein given.

*Ticket printing device—Inking means.*—Suitable inking means is provided for the main printing device and comprise (Fig. 6) a main inking roller 276 and an auxiliary inking roll 277, both of which rolls are supported by forwardly extending arms 278 of a pair of bell cranks 1278 pivoted at 1279 to the sliding frame 258. The bell cranks 278 are normally held in inking position shown in Figs. 5 and 6 by springs 1280 interposed between the downwardly extending arms of said bell cranks and the rear plate of the frame 258. Thus it will be seen that the ink rolls supported by the bell cranks are held in yielding contact with the printing devices. When the main printing device is rotated in the manner hereinbefore described the several printing means carried by the main printing device which are in printing position, will contact with the inking rolls 276 and 277 and be inked thereby. The purpose of providing the auxiliary roll 277 is primarily for inking the consecutive number wheels 149. It will be noted from Fig. 6 that as the main printing device is rotated in the direction of the arrow shown, the consecutive number wheels 149 are slightly beyond the main inking roll 276 and therefore coöperate with the impression roll 263 before it has passed the inking roll 276 to be inked thereby. The auxiliary inking roll 277 is therefore provided and is located slightly in advance of the roll 276 and is adapted to be engaged by the wheels 149 immediately upon the beginning of the rotation of the main printing device thereby inking said consecutive number wheels 149 before the same contact with the impression roll 263. A suitable inking roll is also provided for the auxiliary printing device 255, but the same has been omitted for the sake of clearness in the drawings.

When the frame 258 is moved rearwardly to disable the ticket printing mechanism it is necessary to have means for preventing too great a movement of the bell cranks 127 under the action of the springs 1280. The preventing means shown in Figs. 5, 6, and 8ª comprises a pair of screws 1281 having enlarged heads 1282 engaging the downward extending arms of the bell cranks 1278. The screws extend rearwardly through the rear plate of frame 258 and are provided with adjustable thumb units 1283.

*Ticket printing device—Severing means.*— After a ticket has been printed and fed in the manner hereinbefore described, the portion appearing above the stationary knife 274 is adapted to be severed by the movable knife blade 275. The blade 275 is fast on the upper end of a rock shaft 276 (Fig. 4) which is supported by the frame 51 and is normally held in the position shown in Fig. 8 by a spring 279 which surrounds the lower end of the shaft 276 and has one end fast to the frame of the machine and the other to the end of the shaft. Fast on the lower end of the shaft 276 is an arm 280 (see Figs. 4 and 17). The arm 280 projects toward the left and on its left hand end carries a roller 281 which is adapted to bear against the inner surface of the rim 282 formed on a drum 283 fast on the rotation shaft 85. The rim 282 carries on its inner surface a camming projection 284. The drum 283 is adapted to be rotated in the direction of the arrow shown in Fig. 17, and is given one complete rotation at each operation of the machine. Near the completion of an operation of the machine the camming surface 284 will engage the roll 281 carried by the arm 280 and rock the shaft 276. This movement occurs at the very end of the operation of the machine and after all the feeding movement of the check strip 265 has been effected. The movable knife blade 275 will then be moved and will coöperate with the stationary blade 274 to sever the portion of the check strip which has been fed through the feeding opening 271.

*Record strip printing mechanism.*—It is desirable in a machine of this class to provide means whereby a detail record may be kept of all tickets as issued and also to provide means whereby a printed record may be had showing an audit of the day's business or of any other desired period of time. In order to provide for such a record there is provided in the present machine a strip printing mechanism which is adapted to record every operation of the machine.

The main printing devices hereinabove described is, as mentioned, designed to print on both the issued ticket and upon the record strip. Of course it is unnecessary to print an elaborate record of the use of the ticket as shown on the sample ticket in Fig. 28, but only such information is necessary as will enable a complete record of the transaction. This constitutes merely the consecutive number of the operation of the machine, the style of ticket, that is, whether "full fare," "half fare," or "excursion" rate, the destination, and the consecutive number of the ticket to that particular destination.

As shown in Fig. 27, each of the control devices not only carries the type 94, which is adapted to print on the issued ticket, but also the type 95 which type, as will be seen by reference to the particular one shown in said figure, is adapted to print "F. F. Dayton to Vandalia." This would indicate that the particular control device shown in said figure is appropriate to the issue of a "full fare" ticket from Dayton to Vandalia, and the type plate 95 is adapted to print on the audit record strip in the manner shown in Fig. 29, in which is shown a section of the audit strip as issued by the machine. The consecutive number shown to the left on the upper portion of the section of the strip shown is the consecutive number printed by the consecutive number printing wheels 1491 hereinbefore described in the detailed description of the printing device. The consecutive number appearing to the right of the entries on the section of record strip shown, are printed by the consecutive number printing wheels 224, which it will be remembered are controlled in adjustment by the adjustable slides 97 of the selected control device.

The record strip 500 may be fed from a supply roll (not shown) through the machine as shown in Figs. 6 and 7 and between impression rolls 501 and 5011 and the main printing device. The strip 500 then passes over a guiding roll 502 and then rearwardly and downwardly between a pair of feeding rollers 503 and 504. The strip 500 then passes out through a slot 505 formed in the rear plate 262 of the machine. Adjacent the slot 505 is a cutting edge 506 rigidly mounted on the plate 262 and adapted to facilitate the tearing off of the section of the record strip which is fed through the slot 505.

The roll 503 is given a slight rotation at each operation of the machine to feed the record strip 500 in the following manner: The roll 503 is rigidly mounted on a shaft 507 which extends out through the right hand frame 52 of the machine. Fast on the right hand end of the shaft 507 is a ratchet 508 (Fig. 2) with which is adapted to coöperate a feeding pawl 509. The feeding pawl 509 is carried on one arm of a bell crank 510 pivoted at 511 to the side frame 52 of the machine. The pawl 509 is normally held in engagement with the ratchet wheel 508, as shown in Fig. 2, by a spring 512 carried by the bell crank 510. The bell crank 510 is normally held in the position shown in said figure by a spring 513, which is wound around a pin on the frame 52 and has one end fast to the frame and the other end fast to the bell crank arm 514. The upwardly extending arm 514 of said bell crank 510 is held by the spring 513 in constant engagement with a projecting end 515 formed on the downwardly extending arm 233 of the bell crank 205 which, as hereinbefore described, is adapted to receive a reciprocating movement at each operation of the machine. The first movement of the bell crank 205 is in the direction of the arrow shown in Fig. 2. When the bell crank 205 is so rocked the lower projecting end 515 will pass away from the upwardly projecting arm 514 of the bell crank 510, thereby permitting said bell crank to rock in a clockwise direction about its pivot 511 under the action of spring 513 and move the pawl 509 carried thereby the distance of one tooth relative to the ratchet 508. Upon the rocking movement of the bell crank 205 in the reverse direction in its reciprocation the downwardly projecting portion 515 of its arm 233 will engage the upwardly extending arm 514 of the bell crank 510 and thereby rock said bell crank 510 against the tension of spring 513 back to normal position shown in Fig. 2. This restoring movement of the bell crank 510 will effect a slight rotation of the ratchet 508 and its appropriate feeding roller 503 whereby the record strip 500 will be moved a small distance, sufficient to bring a new portion of the record strip to the printing line. Also rigidly mounted on the right hand end of the shaft 507 is a knob 516 through the medium of which a manual rotation of the shaft 510 may be effected by the operator in case it is desired to "space" the detail strip. This spacing of the detail strip is frequently resorted to in machines of the present type for the purpose of indicating on the record strip the division of shifts so that in case a new operator takes charge of the machine the record strip may be spaced manually a short distance but a distance which is greater than the ordinary spacing operation, thereby indicating on the record strip the tickets which are sold by the different operators. The knob 516 is also for the purpose of feeding all of the printed portion of the record strip out through the slot 505 before the printed section of the record strip 500 is severed from the main body portion of the strip.

The upper portion of the section of the strip 500, which is shown in Fig. 29, shows the detail entries of the tickets as issued, the initials "F. F." standing for "full fare", "H" for half fare, and "Ex" for "excursion" tickets. The lower portion of the record strip as shown in said figure indicates the printed entries which are made on the record strip when the machine is audited. During the audit operation, as will be hereinafter described, the different control devices are brought one at a time into coöperation with the main printing device whereby there will be printed on the record strip the style of ticket indicated by the initials "F. F.", "H", or "Ex", the stations between which the ticket is good and also a consecutive number showing how many tickets were issued for use between said stations. It will be noted that during the audit operation the consecutive number to the left of the station entries is omitted. It will be recalled that hereinbefore in connection with the detail description of the consecutive number printing device means were mentioned which were adapted to become effective upon an audit operation to disable the consecutive number wheels which print the consecutive number to the left of the station entries. Said means will be more particularly described hereinafter in connection with the mechanism for adjusting the machine for auditing operations, but it is thought best to call attention to this difference in the printed entries at this point.

*Record strip printing mechanism—Impression mechanism.*—Impressions are made on the record strip from the main printing device by a main impression roll 5011 suspended between the frame 52 and auxiliary frame 1051 and also by an auxiliary impression roll 501 carried by the sliding frame 258 (see Figs. 7 and 8ª). The purpose of employing separate impression rolls as just described is to permit of the preventing of an impression being taken from the operation consecutive number printing device during an auditing operation. As the frame 258 is withdrawn from coöperative relation with the main printing device during audit operations it is preferred to mount the section 501 of the record strip impression means on said frame.

*Record strip printing mechanism—Inking mechanism.*—The inking mechanism for the strip printing section of the printing device is also formed in two sections for the same reasons as pointed out above with reference to the impression means (see Figs. 7 and 8a). The operation consecutive number printing means are inked by an inking roll 2771, carried by the sliding frame 258. To permit of the disabling of the inking roll 2771 during audit operations, the remaining portion of the strip printing section of the printing device is inked by an ink roll 2772 suspended between the side frame 52 and auxiliary frame 1051.

*Totalizing mechanism—Actuating means.*— In order to provide a suitable mechanism for at all times recording the total amount of money which is to be taken in for tickets issued and sold, there is provided suitable totalizing mechanism which is adapted to be operated on the operation of the machine to record the price of a ticket issued. It is one of the prime objects of a machine of this type to record the price of the ticket independent of any operation by the operator. It will thus be seen that the absolutely correct price of a ticket will be registered on the totalizer and it is therefore incumbent on the ticket seller to procure the proper price for the ticket. The control devices which are selected by the operator for operation therefore afford an excellent medium for controlling the totalizing mechanism. This means of control is shown and described in detail in the hereinbefore mentioned United States Letters Patent, but will be described again herein as the specific mechanisms for controlling the totalizing mechanism are novel in the present application.

As hereinbefore mentioned, each of the control devices is provided with a plurality of fingers 96 (Fig. 26) rigidly carried by the left hand end of the control devices and forming amount determining means for controlling the differential operation of the totalizing mechanism. When a control device has been selected for coöperation with the main printing device and has been carried from the supporting means to the printing device, the amount determining fingers 96 will be brought into direct operative alinement with the right hand ends of a series of actuating slides 287. (Figs. 1, 13 and 14).

The totalizing mechanism is mounted between frame plates 50 and 51 and is directly supported by auxiliary frame plates 285 and 286. The slides 287 are mounted to slide in guideways 288 and 289 mounted between the auxiliary frames 285 and 286. Rigidly mounted on the left hand end of each of the slides 287 is a standard 290 to which is connected one end of a spring 291, the other end of which spring is connected to a rigid plate 292. The springs 291 are normally under tension and tend to draw the slides 287 to the right. Such movement, however, is prevented by the engagement of the dwell portion of a camming flange 293 formed on the drum 283 with lugs 294 carried on the underside of each of the slides 287 (Figs. 13 and 14). It will thus be seen that until the operation of the machine is begun, to rotate the drum 283, the slides 287 are normally held against movement.

A locking and alining means is also provided for holding the slides 287 temporarily against movement, said locking and alining means comprising a plurality of spring pressed pawls 295 pivoted loosely on a shaft 296 carried by and between supporting arms 297 mounted fast on the frame 51. The left hand end of the pawls 295 are normally held in engagement with ratchet teeth 298 formed on the upper edges of the slides 287 by the springs 299 interposed between the left hand ends of the pawls 295 and the plate 292 hereinbefore referred to, which is fast on the supporting arms 297. Also pivoted on shaft 296 is a bell crank 300. An arm 301 of said bell crank 300 extends to the left and carries a long pin 302 which extends forwardly beneath all of the pawls 295. The downwardly extending arm 303 of said bell crank 300 is held in contact with the right hand edge of the rim of drum 283 by a spring drawn lever 304 (Figs. 1, 4, 13 and 14), pivoted at 305 to the frame 285 and connected at its forward end to the frame 51 by a spring 306. The right hand edge of the flange of the drum 283 is formed with a cut-away portion 307, and shortly after the beginning of the operation of the machine the said cut-away portion will reach the downwardly extending arm 303 of the bell crank 300 and thereby permit the rocking movement of said bell crank under the action of spring 306 (see Figs. 13 and 14). This rocking movement of the bell crank 300 will effect the disengagement of pawls 295 on the rack teeth 298 through the medium of the pin 303 carried by said bell crank.

Immediately after the slides 287 are so released the end 308 of the dwell portion 2931 of the flange 293 will pass the lugs 294 carried by the slides 287 and thereby permit a movement of the slides to the right under the action of their springs 291. This movement will continue until the right hand ends of said slides engage the amount determining fingers 96 then in alinement with them. It will thus be seen that the slides 287 will be differentially arrested according to the preadjustment of the amount determining means that is the length of their alined fingers 96 on the selected control device. It will readily be seen that the slides 287 are released in succession as the end 308 of the flange 293 passes the lugs 294, this succession running from the slide of lower order or units-of-cents slide to the slide of higher order or tens-of-dollars slide, there being only four slides provided in the present instance to correspond with the number of amount determining fingers 96. The purpose of the successive release of the slides 287 is to enable the successful operation of the novel form of transfer mechanism which is provided in the present invention.

Each of the slides 287 is formed on its under side with rack teeth 310 (see Figs. 13 and 13ª), adapted to mesh with a corresponding pinion 311 when the slide 287 is moved to the right. The pinion 311 rotates loosely on a shaft 312 supported by the two auxiliary frames 285 and 286. Fast to each pinion 311 is a frame or spider 313 mounted to rotate with said pinion 311 and carrying a pair of pawls 314 and 315 normally spring drawn into engagement with an internal ratchet 316 formed in a ratchet flange 317 carried by a larger gear 318 mounted to rotate on the shaft 312. The pawls 314 and 315 are normally held in engagement with said internal ratchet 316 by springs 319.

Each gear 318 is adapted to adjust a corresponding totalizer element 320 through the medium of an intermediate gear 321 and a gear 322, the gear 322 being fast to the totalizer element 320. It will thus be seen that, as the pawls 314 and 315 are in engagement with the ratchet teeth 316, when the slide 287 moves to the right, the teeth 310 carried by the latter will engage the pinion 311 and through the medium of the train of gearing just above described, will adjust the corresponding totalizer wheel 320 to an extent commensurate to the value represented by the amount determining finger appropriate to said slide 287. Upon the continued operation of the machine and the rotation of the shaft 285 the camming flange 293 carried by the drum 283 will, through its spiral formation engage the lugs 294 carried by the slides 287 and force all of the adjusted slides to the left. The restoration of the slides 287 is begun before the rotation of the main printing device is begun so as to withdraw the slides 287 from engagement with the pins 96. The movement of the slides to the left will, however, have no effect on the totalizer wheels by reason of the one way ratchet connections formed by the pawls 314 and 315, and the ratchet teeth 316. To prevent any retrograde movement of the totalizer wheels, the ratchet flanges also have formed thereon a series of external ratchet teeth 323 with which are adapted to coöperate with pawls 324 loosely pivoted on a shaft 325 supported between the auxiliary frames 285 and 286. It will readily be seen from the formation of the pawl 324, as shown in Fig. 13, that any retrograde movement of the totalizer wheels 320 during the restoring movement of the adjusted slides will be prevented.

*Totalizer mechanism—Transfer devices.—* In order to provide for the transfer of a unit from a totalizer wheel of lower order to a totalizer wheel of higher order a novel form of transfer mechanism has been provided (Figs 13 and 13ª).

Each of the gears 318 above referred to carries a pin 326 which, upon a complete rotation of said gear in the direction of the arrow, shown in Fig. 13, will engage an arm 327 loosely mounted on a shaft 328, extending between the sub-frame 285 and the upturned portion 1289 on the guide plate 289, and rigidly connected to an arm 329 by a sleeve 330. The transfer mechanisms intermediate the units and tens of cents slides, tens of cents and units of dollars slides, and units and tens of dollars slides are similar in construction, and therefore only the one appropriate to the two slides of lowest order will be described in detail. The arm 327 is in front of the slide 287 of higher order, while the arm 329 is in the rear of the slide of next higher order and the sleeve 330 extending between said arms 327 and 329 passes over a pawl 331 pivoted at 332 within a slot in the slide of higher order. On its under side the periphery of the sleeve 330 is flattened as at 333 and in the normal position of the parts the upper edge of the pawl 331 rests against said flattened portion, being held in such position by a spring 1331 shown in Fig. 13ª of the drawings. At its left hand end the pawl 331 carries a tooth 334 which is normally elevated as shown in Figs. 13 and 13ª, but during a transfer operation the tooth is adapted to be forced downward into engagement with the pinion 311, thereby forming an extra tooth on the rack 310. Consequently upon the operation of the slide 287 of higher order when the pawl 331 is in depressed position the totalizer wheels 320 of higher order will be rotated an extra step because of the lengthening of the rack 310 as just described. The depression of the left hand end of the pawl 331 to so lengthen the rack is effected by a rotation of the sleeve 330. The rotation of the sleeve 330 is effected when the pin 326 carried by the gear 318 passes the zero point when it will engage the arm 327 and thereby rock the same in a counter-clockwise direction. This movement of the arm 327 will effect a similar movement of the sleeve 330 thereby bringing the periphery of said sleeve of greater radius into engagement with the upper edge of the pawl 331. The sleeve 330 therefore acts as a cam to rock the pawl 331 about its pivot 332 to cause the tooth 334 carried by said pawl to move downward to extend the rack 310 of the slide of higher order.

As the slides 287 are released in succession from a lower to a higher order, it will readily be seen that as soon as the units slide 287 is released it will move rapidly to the right under the action of its spring 291. If the units slide 287 moves to an extent sufficient to cause its appropriate totalizer element 320 to pass the zero point and thereby necessitate a transfer, the arm 327 appropriate to the units slide will immediately be rocked during the rotation of the gear 318 appropriate to the units slide. The transfer mechanism appropriate to the tens slide will therefore be adjusted before the tens slide is released to allow the same to move to the right. Therefore the rack 310 in effect will be lengthened one tooth before the tens slide is released.

At the end of the operation of the machine in order to restore any of the transfer devices which have been positioned and operated during the operation of the machine, there is provided a lever 335, pivoted on a shaft 336 carried between the auxiliary frames 285 and 286, and normally held in the position shown in Fig. 13 by a spring 337 surrounding the shaft 336 and having one end fast to the plate 285 and the other to the lever 335. In the position of the lever 335 shown in Fig. 13, the lower end 338 of said lever is held by the spring 337 in engagement with a camming disk 339 fast on the shaft 85. The disk 339 is formed with a camming shoulder 340 which, upon the rotation of the shaft 85, is adapted to engage the lower end 338 of the lever 335 and thereby rock said lever in a counter-clockwise direction about the shaft 336 and against the tension of the spring 337 to cause a forwardly extending arm 341 carried by the upper end of said lever and extending across to the right of the arms 329 to engage said arms and rock the same in a clockwise direction, thereby restoring the arms 327 and sleeves 330 which were moved during an adjustment of the slides 287. The pawls 331 are then free to be restored by the action of their springs hereinbefore mentioned.

As the shaft 85 which carries the drum 283 is rotated in the direction of the arrow shown in Figs. 5 and 6, it will be seen that the slides 287 are released near the beginning of the operation machine and just after the selected control device has been transferred to the main printing device. It is then necessary to withdraw the slides 287 from their adjusted position before the printing device begins its rotation to print the ticket to be issued, and the record strip. The cam flange 293 is therefore formed spirally about the drum 283 to withdraw the slides 287 immediately after the adjustment of the same. As hereinbefore stated the flange 293 is formed with the final dwell portion 2931. It will therefore be seen that all slides 287 which may have been adjusted, are restored completely and during the latter portion of the operating movement of drum 283 all of the slides will be held in home position. As soon as the slides 287 have been adjusted and simultaneously with the restoration of the slides to normal zero position the cam disk 339 and camming shoulder 340 carried thereby will become effective to restore any one of the transfer devices which were set and operated during the adjustment of the slides 287.

As the transfer devices just above described are only adapted for use in transferring between the totalizer elements appropriate to the four slides 287 shown in the drawings, it is necessary to provide an auxiliary transfer device between totalizer elements of higher order so as to provide for a greater registering capacity than would be provided by merely the four totalizer elements appropriate to the four slides 284. The auxiliary transfer mechanism is shown in Figs. 14, 15 and 16.

The pinion 318 appropriate to the tens of dollars slide 287 and tens of dollars registering wheel 320 is fast to a mutilated gear 342 (Fig. 16) which is formed with seven teeth occupying one tenth of the circumference as shown in said figure. Upon the completion of a single rotation of the tens of dollars totalizer wheel 320 the seven teeth carried by the mutilated gear 342 appropriate thereto will engage a broad pinion 343 supported by a shaft 344 mounted between the auxiliary frame 286 and an upturned portion 1289 on the guide plate 289. The broad pinion 343 is constantly in mesh with a gear 345 appropriate to the hundreds of dollars totalizer wheel 320. It will thus be seen that upon the completion of each rotation of the tens of dollars totalizer wheel the seven teeth carried by the mutilated gear 342 appropriate thereto will be effective to rotate the broad pinion 343 and gear 345 a slight distance sufficient however through their gear connections with the hundreds of dollars totalizer wheel to adjust the hundreds of dollars totalizer wheel one step. Referring to Figs. 14 and 15 it will be noted that the gear 345 also has fast on its rear side a pinion 318 which through the intermediate pinions 321 and 322 is adapted to drive the appropriate totalizer wheel 320.

In order to prevent any overthrow of the totalizer wheels 320 of an order higher than a tens of dollars wheel, there is fast to each gear 345 a ratchet disk 346 (Fig. 16) formed with teeth which are formed reversely to the teeth 323 of the ratchet flanges 317 carried by the gears 318 appropriate to the slides of lower order. Co-operating with the teeth of the ratchet 346 is a pawl 347 also loosely pivoted on the shaft 325. It will readily be seen that as the gears 348 are rotated in the direction shown by the arrow in Fig. 15 it is necessary to withdraw the pawl 347 from locking position when the transfer is being effected from the tens of dollars wheel to the hundreds of dollars wheel. The mutilated gear 342 therefore carries a small bevel lug 348 which, upon the completion of the rotation of the mutilated gear, is adapted to engage a flange 349 carried by the pawl 347, which engagement is effected just at the time that the teeth carried by the mutilated gear 342 are about to engage the broad pinion 343. Therefore upon the continued rotation of the mutilated gear 342 the bevel lug 348 carried thereby will elevate the left hand end of the pawl 347 through the medium of the flange 349 carried thereby. This will withdraw the locking tooth carried by the pawl 347 from engagement with the teeth of the ratchet disk 346 and permit one step of rotation of the gear 345 of the wheel of higher order. The same transfer mechanism may be employed upon the thousands and tens of thousands of dollars premiums, etc.

*Auditing devices.*—As heretofore stated in the early part of the specification, it is one of the purposes of the present invention to provide a machine whereby an audit of business may be had at any time desired.

When an audit of the business is to be made the slides 97 of the control devices form an excellent basis for determining the amount of business handled by the machine and the control devices are therefore employed in substantially the same manner as in the ticket issuing operation. However, during an auditing operation it is, of course, unnecessary to issue tickets whenever the control devices are employed. It is also not desired to print on the audit strip a consecutive number of the operation of the machine nor actuate the consecutive number printing wheels which ordinarily perform that function. It is furthermore not desired to change the adjustment of the slides 97 of the control devices. Furthermore, when no ticket is to be issued by the machine it is desired to disable the feeding mechanism for the ticket strip so that no ticket will be issued. Furthermore, when an auditing operation is to be effected no adjustment of the totalizer elements is to take place as the true total of the business handled by the machine will then be destroyed. Adjustable means are therefore provided whereby when it is desired to employ the machine for auditing the business handled thereby during any desired length of time, all of the mechanisms which are employed for performing the functions above stated as undesirable during an audit operation, will be disabled. All of the disabling operations of said mechanism are effected by a simple adjustment of a small hand lever 350 mounted fast at the left hand end of the machine on a shaft 351 extending across the entire machine. The various disabling operations performed by the lever 350 will be described separately.

The manner in which the totalizer mechanism is disabled by the lever 350 is as follows. Fast on the shaft 351 is a pinion 352 which is adapted to rotate a pinion 353 (Fig. 3) loosely mounted on the shaft 85 through the medium of a chain connection 354. The pinion 353 (Fig. 13) is rigidly connected to a plate 355 through the medium of a sleeve 356 surrounding the shaft 85. When the lever 350 is in the position shown in Fig. 3 the plate 355 will be in the position shown in Fig. 17. When the lever 350 is moved in a clockwise direction, the plate 355 will be moved in the same direction and will pass between the lugs 294 hereinbefore mentioned, and lugs 357 carried by the slides 287 adjacent the lugs 294. When the plate 355 is so moved as to stand between the lugs 294 and 357 of the slides 287, it will readily be seen that upon an operation of the machine the slides 287 will be prevented from moving to the right under the action of the springs 291 or even to the left when the drum 283 is rotated to release the same. Consequently no adjustment of the totalizing wheels 320 will be effected.

As hereinbefore stated, the impression rolls 263 and 264 of the check printing mechanism are carried by the frame 258 which is slidably mounted on the frames of the machine and normally spring pressed to printing position. The frame 258 in this position bears against an eccentric cam 358 (Fig. 7) fast on the shaft 351. The formation of the cam 358 is such that when the lever 350 is rocked in a clockwise direction in said figure the cam will become effective to force the sliding frame 258 rearwardly thereby withdrawing feeding and printing rollers 263 and 264 from feeding and printing positions. Consequently when the main printing device and the auxiliary printing devices are rotated, no impression will be made on the ticket strip 265 and by reason of the disengagement of said printing devices and the rolls 263 and 264 the ticket strip 265 will not be fed to issue a ticket. When the frame 258 is so moved to carry the rolls 263 and 264 out of printing and feeding position the ink rolls 276 and 277 will also be withdrawn from inking position so that no unnecessary inking of the electros and printing means for printing the ticket will be effected. Also fast on the shaft 351 is a pinion 359 located at the extreme right hand end of the machine and shown in Fig. 2. The pinion 359 is operatively connected to a similar pinion 360 by a chain connection 461. The pinion 360 is fast on a shaft 361 which is supported in the frames of the machine. Fast on the shaft 361 is a sleeve 362 formed with a spiral cam groove 363 (Fig. 8). The cam groove 363 is adapted to coöperate with a roller 364 carried by levers 365 pivoted at 366 to a frame 367 carried by the frame of the machine. Carried by the forward end of the lever 365 is a roller 368 projecting into a peripheral groove 369 formed in the hub of the gear 244 hereinbefore described. It will be recalled that the gear 244 is splined on the shaft 236 and is for the purpose of forcing the arm 245 downwardly to actuate the slide 246 (Fig. 9) for the purpose of adjusting the units slide 97 of a selected control device. When, however, the lever 350 is rocked in a clockwise direction, as hereinbefore mentioned, the shaft 361 will be moved in a similar direction and through the medium of the cam slot 363 the lever 365 will be rocked about its pivot 366. This rocking movement of the lever 365 will through the medium of the roller 368 and peripheral groove 369 formed in the hub of the gear 244, slide said gear 244 to the left as shown in Fig. 8. When the gear 244 is moved to the left it will readily be seen that the teeth of said gear will be disengaged from the rack formed on the arm 245 and consequently when the shaft 236 is rocked upon the operation of the machine no downward movement of the arm 245 will be effected. In order to lock the arm 245 in its upper position when the gear 244 is disengaged therefrom the lever 365 is formed on its forward end with a bevel projection 370 which, when the lever 365 is rocked, is adapted to engage the teeth of the rack formed on the arm 245 and thereby hold the said arm in upper position as long as gear 244 is disengaged therefrom. It will readily be seen that when the gear 244 is so moved, when the lever 350 is moved to auditing position, no adjustment of the slides 97 of a selected control device will be effected and therefore the consecutive number shown by the slides of the control devices will truly represent the number of tickets which are issued to each destination.

In order that no idle adjustment of the consecutive number printing wheels 149 will be effected during auditing operations of the machine, means are provided for permanently holding the racks 212 out of operative engagement therewith during auditing operations. It will be recalled that in a previous description of the racks 212 and the frame 213 carrying the same that the frame 213 was pivotally mounted at its upper end at 214. Coöperating with the frame 213 is an eccentric 371 which is similar to the eccentric 223 hereinbefore described. The eccentric 371 is rigidly mounted on a short rock shaft 372, which has fast thereto an arm 373 which is pivotally connected at its lower end to a link 374 which extends rearwardly and is pivotally connected to a downwardly extending arm 375 fast on the left hand end of the shaft 361. When the shaft 361 is rocked in the manner hereinbefore described, the shaft 372 will likewise be rocked through the medium of the link 374. When the shaft 372 is so rocked the eccentric 371 will be effective to rock the lower end of the frame 213 forwardly and thereby positively disengage the racks 212 carried thereby from the consecutive number printing wheels 186. As the eccentric 371 will remain in this position of adjustment as long as the lever 350 is in auditing position, it will readily be seen that the racks 212 will be permanently held out of engagement with the consecutive number printing wheels 186 throughout an auditing operation.

During the auditing operation of the machine it is, of course, not desired to operate the consecutive number printing wheels which print the consecutive number representing the number of ticket printing operations of the machine. As hereinbefore mentioned, there are provided adjacent each of the sets of consecutive number printing wheels for printing the consecutive number of the operation of the machine, and small cams 146 and 155 for the purpose of disabling the operating plates 141 and 152 which coöperate with the selected control device when it is transferred to the printing device. It has been hereinbefore described how upon the rotation of the disk 160 the shafts 153 and 142 will be rotated to adjust the cams 146 and 155 to disable said operating plate 141 and 152. The means for slightly rotating the disk 160 will now be described.

Fast on the shaft 361 is an upwardly extending arm 380 which is pivotally connected to the rear end of a link 381, the forward end of which is connected to a downwardly extending arm 382 loosely pivoted on the shaft 236. The normal position of the arm 382 is as shown in Fig. 7. When the lever 350 is moved to an auditing position the lever 382 will be rocked in a counter-clockwise direction under action of the connections with the shaft 361 above described. When the arm 382 is so moved its lower end will engage in a notch 384 formed in the periphery of the disk 160 and upon the continued movement of said arm 383 the disk 160 will be rotated in the direction of an arrow shown in Fig. 12. Through the medium of the internal rack 359 formed on a flange carried by the disk 160 the pinion 158 will be slightly rotated and through the medium of the pinion 158 the shafts 153 and 142 will be rocked to adjust the cams 146 and 155 to disable the consecutive number printing wheel operating means in the manner hereinbefore described. Consequently upon the transfer of a selected control device from the common supporting means to the main printing device no adjustment of the consecutive number printing wheels controlled by the plates 141 and 152 will be effected as the plates will be moved out of coöperative relation with the control devices when the lever 350 is moved to auditing position.

*General operation.*—The general operation of the machine hereinbefore described is as follows: The normal position of the operating parts of the machine when adjusted for ticket printing operations is shown in Figs. 1 to 8 inclusive with the lever 350 in upper position as shown in Fig. 3, in which position of the lever 350 all of the several operating parts of the machine which are disabled by said lever 350 are in operative condition. If it is desired to issue a "full fare" ticket to "Sidney," the operator will first grasp the knob 118 carried by the adjusting lever 117 on the left hand end of the machine shown in Fig. 3, and move said lever in a counter-clockwise direction until the lever 117 stands just over the station "Sidney" in the full fare zone of the scale carried by the left hand frame of the machine. When the lever is in this position of adjustment the knob 118 is released and under the action of the spring 1261 the alining pins 119 carried by the lever 117 will be forced into the alining hole 120 appropriate to the "Sidney" "full fare" position of the controlling levers 117. This adjustment of the lever 117 will bring the control device appropriate to the printing of a "full fare" ticket to "Sidney" to position of coöperation with the main printing device. The machine is then in condition for operation and the operation is effected as hereinbefore stated by rotation of the crank handle 53 or any other suitable form of operating means as desired. Upon a rotation of the operating handle the selected control device will be transferred to the main printing device. When the selected control device is so transferred to the main printing device it will adjust the consecutive number printing wheels which are adapted to print the consecutive number of the operation of the machine. The slides 287 of the totalizing mechanism are then released in succession so as to permit of the coöperation of said slides with the amount determining means carried by the selected control device and thereby adjust the totalizer elements to an extent appropriate to the value of the ticket to be issued. Simultaneous with the adjustment of the totalizer operating slides the operating means for the consecutive number slides 97 of the selected control device will be effective to adjust the units slides of the selected control device one step. Upon the continued operation of the machine the yokes 210 at the top of the machine will be released so as to cause the graduated slides 114 to move downwardly to cause the graduations formed on the lower end thereof to coöperate with the right hand ends of the slides 97 of the selected control device and thereby adjust the two sets of consecutive number printing wheels to a position appropriate to the position of adjustment of the slides 97. The purpose of the two sets of consecutive number wheels, it will be recalled, is to provide a set of wheels for the printing of the ticket and also for the printing of the record strip. As soon as the consecutive number wheels for printing the consecutive number represented by the control device have been positioned, the positioning racks for the same will be disengaged from the said wheels and the yokes restored to normal position. Simultaneous with the restoration of the yokes and actuating connections for the consecutive number wheels, the printing device will be rotated, carrying with it its selected control device 97, to print the ticket to be issued and also to print on the record strip the consecutive number of the ticket printing operation of the machine and also the class of ticket, that is in this particular instance, full fare, the destination for which the ticket was issued and the consecutive number of the ticket for that destination. Upon the completion of the printing operation the issued section of the ticket strip will be severed and the record strip will be advanced a single printing space.

At the end of the operation of the machine the printing device has made one complete rotation and brought the control device employed in the printing of the ticket and record strip back into alinement with its pins 89 and between the transferring jaws 132 and 133 after which, it is by these jaws, carried back from the main printing device to its proper supporting pins of the common supporting means of the control devices. The machine will then be arrested at a completion of the single rotation of the operating handle to prevent any over-operation of the same. The latching means which arrest the movement of the handle upon the completion of a rotation of the machine, it will be recalled, are under the control of the setting lever 117 and it will therefore be seen that it will be necessary to operate said setting lever to position the proper control device before the operating mechanism for the machine may be operated. If it is then desired to operate the machine to determine how many tickets have been issued to each of the stations for which the machine is equipped, the auditing lever 350 is moved to lower position, which is the auditing position. This movement of the auditing lever to auditing position will disable the following mechanism: 1. Totalizer operating mechanism. 2. Ticket printing mechanism. 3. Consecutive number devices showing number of ticket issuing operations. 4. Connections for adjusting the station consecutive number wheels for the ticket printing section. 5. The adjusting mechanism for the consecutive number slides of the control devices.

In the further operation of the machine for auditing the business handled by the same, the operator may operate the main operating device so as to employ first the control device which happens to have been positioned relative to the main printing device upon the last operation of the machine, or he may first adjust the lever 117 to the station "Vandalia" of one of the three zones representing "full fare", "half fare", or "excursion.". The machine may then be operated and the lever moved one step to position representing "Tippecanoe City." And so on at each operation of the machine the lever 117 is to be moved the distance of one station alining hole 120. It will thus be seen that if this operation is followed out the auditing of all of the stations of each zone will be grouped on the record strip as shown in the section of the record strip represented in Fig. 29 of the drawings. When the selected control device is transferred from the supporting means to the printing device it will, of course, not have any effect on the consecutive number wheels which are adapted to print the consecutive number of the ticket issuing operations, as no ticket is to be issued during audit operations. The yokes 210 are released in the regular manner to allow the graduated plates 114 to descend so as to enable the setting up of the right hand set of consecutive number wheels on the printing device which wheels are adapted to print on the record strip the total number of tickets which have been issued employing the positioned control device. During the continued operation of the machine, the control device and the consecutive number printing wheels just above mentioned will cause an impression to be made on the record strip so that the record strip will show first the class of ticket such as "full fare", the stations between which the control device is appropriate, and also the consecutive number representing the total number of tickets of that class which have been issued.

After all of the control devices have been employed during the auditing operation, the record strip is adapted to be fed out through the slot in the rear part of the machine by means of the small knob 516 carried by the outer end of the shaft 517 upon which is rigidly mounted the feeding roll 503. As soon as all the printed portion of the record strip has been fed out by this means, the printed portion of the record strip may be detached and will represent the entire business handled by the machine.

It will readily be understood that in any desired use of the machine hereinbefore described any one of the mechanisms may be dispensed with without destroying the efficiency of the other mechanisms and that in certain uses of the machine it may be desired to dispense with some of the disabling means employed in the auditing operations. The embodiment shown in the present disclosure is the applicant's conception of the preferred embodiment, but it will readily be understood that any one of the mechanisms may be rearranged or dispensed with without departing from the spirit of the invention. In the uses of the machine by different railways it would, of course, be optional with the auditing divisions of the said railways to provide the several mechanisms for performing the different functions of the machine, and the constructions shown are adapted readily to be rearranged to suit the needs of the different railways.

While the form of mechanism herein shown and described, is admirably adapted to fulfil the objects primarily stated, it is to be understood that it is not intended to confine the invention to the one form of embodiment shown and described herein, as it is susceptible of embodiment in various forms, all coming within the scope of the claims which follow.

What is claimed is:—

1. In a machine of the class described, the combination with a plurality of control devices arranged in groups, of a printing device adapted to receive one of said control devices, a plurality of adjustable electros each appropriate to one of said groups, means for establishing a coöperative relation between said printing device and any one of said control devices, and connections for adjusting the electro appropriate to the group including the selected control device.

2. In a machine of the class described, the combination with a plurality of control devices arranged in groups, of supporting means for the same, a printing device adapted to receive one of the control devices, a plurality of electros for the printing device each appropriate to one of said groups and adjustable singly to printing position, means for adjusting said supporting means to establish a coöperative relation between the printing device and one of said control devices, and connections for adjusting the electro appropriate to the group including the selected control device.

3. In a machine of the class described, the combination with a plurality of control devices arranged in groups, of supporting means for the same, a printing device adapted to receive one of the control devices, a plurality of electros for the printing device each appropriate to one of said groups and adjustable singly to printing position, manually operable means for adjusting said supporting means to establish a coöperative relation between said printing device and one of said control devices, and connections intermediate the adjusting means and electros for adjusting the electros appropriate to the group including the selected control device.

4. In a machine of the class described, the combination with a plurality of control devices arranged in groups, of a printing device adapted to receive one of said control devices, a plurality of adjustable electros each appropriate to one of said groups, and means for establishing a coöperative relation between said printing device and one of said control devices and adjusting said electros.

5. In a machine of the class described, the combination with a plurality of control devices, of a printing device adapted to receive one of said control devices, a plurality of adjustable electros, and means for establishing a coöperative relation between said printing device and any one of the control devices and adjusting said electros.

6. In a machine of the class described, the combination with a plurality of control devices, of a printing device adapted to receive one of said control devices, a plurality of electros carried by the printing device and adjustable singly to printing position, and means for establishing a coöperative relation between said printing device and any one of the control devices and adjusting said electros.

7. In a machine of the class described, the combination with a plurality of devices, of a printing device adapted to receive one of said devices, a plurality of electros adjustable singly to printing position, and means for establishing a coöperative relation between said printing device and any one of the devices and adjusting said electros.

8. In a machine of the class described, the combination with a plurality of control devices, of a printing device adapted to coöperate therewith; a plurality of electros adjustably mounted on the printing device, and means for establishing a coöperative relation between said printing device and any one of the control devices and adjusting said electros.

9. In a machine of the class described, the combination with a plurality of control devices, of means for supporting the same, a printing device adapted to coöperate with said control devices, a plurality of electros adjustably mounted on the printing device, means for adjusting said supporting means to establish a coöperative relation between the printing device and any one of the control devices and connections intermediate said supporting means and printing device for adjusting said electros.

10. In a machine of the class described, the combination with a control device, of a printing device adapted to receive the same, adjustable printing means carried by the printing device, and adjustable devices carried by the control device for controlling the adjustment of the printing means to an extent appropriate to the adjustment of the adjustable devices.

11. In a machine of the class described, the combination with a control device, of a printing device adapted to receive the same, a plurality of sets of printing means carried by the printing device, and a single set of adjustable devices carried by the control device for controlling the adjustment of all of said printing means to an extent appropriate to the adjustment of the adjustable devices.

12. In a machine of the class described, the combination with a plurality of control devices, of adjustable means carried by each of the control devices, a printing device adapted to receive one of said control devices, means operable as a preliminary to an operation of the main operating mechanism for establishing a coöperative relation between said printing device and one of the control devices, means operable upon an operation of the main operating mechanism for inserting the selected control device in the printing device, adjustable printing means carried by the printing device, and connections whereby said printing means will be adjusted to an extent appropriate to the adjustment of the adjustable devices of the inserted control device.

13. In a machine of the class described, the combination with a series of control devices, of adjustable means carried by each of the control devices, a printing device adapted to receive one of said control devices, selective means for selecting the control device to be received by the printing device, adjustable printing means carried by the printing device, and connection whereby said printing means will be adjusted to an extent commensurate to the adjustment of the adjustable device of the selected control device.

14. In a machine of the class described, the combination with a main operating mechanism, of a series of control devices, adjustable means carried by each of the control devices, a printing device adapted to receive one of said control devices, selective means for establishing a coöperative relation between said printing device and one of said control devices as a preliminary to an operation of the main operating mechanism, adjustable printing means carried by the printing device, and connections effective upon an operation of the main operating mechanism to adjust said printing means to an extent commensurate to the adjustment of the adjustable devices of the selected control device.

15. In a machine of the class described, the combination with a printing device, including adjustable printing means, of a control device adapted to form a part of said printing device and including adjustable devices, and connections for adjusting said printing means to an extent commensurate to the adjustment of the adjustable devices.

16. In a machine of the class described, the combination with a printing device including adjustable printing means and latching devices for holding the same in adjusted position throughout an operation of the printing device, of a control device adapted to form a part of said printing device and including adjustable devices, connections for adjusting the printing means to an extent commensurate to the adjustment of the adjustable devices, and means for disabling said latching devices as a preliminary to an operation of said connections.

17. In a machine of the class described, the combination with a printing device including adjustable printing means, spring means tending to hold said printing means in normal position, and restraining means for holding said printing means in adjusted position; of a control device adapted to form a part of the printing device and including adjustable devices; connections for adjusting the printing means to an extent commensurate to the adjustment of the adjustable devices, and means for disabling said restraining means as a preliminary to an operation of said connections.

18. In a machine of the class described, the combination with a printing device of a control device separate from the printing device but adapted to be inserted therein to form a part of said printing device and including adjustable devices, and means carried by the printing device for adjusting said adjustable devices.

19. In a machine of the class described, the combination with a main operating mechanism, of a printing device operated thereby, a control device separate from the printing device but adapted to be inserted therein to form a part of said printing device and including adjustable devices, and means operated by the main operating mechanism for adjusting said adjustable devices.

20. In a machine of the class described, the combination with a main operating mechanism, of a printing device operated thereby, a control device separate from said printing device but adapted to be inserted therein to form a part of said printing device and including adjustable devices, and means carried by the printing device and actuated by the main operating mechanism for adjusting said adjustable devices.

21. In a machine of the class described, the combination with a printing device adapted to receive a control device, a control device separate from the printing devices but insertible therein and including adjustable devices, means for inserting said control device in the printing device and means for adjusting said adjustable devices when the control device is inserted.

22. In a machine of the class described, the combination with a main operating mechanism, of a printing device operated thereby and adapted to receive a control device, a control device separate from the device, but insertible therein and printing device but insertible therein and including adjustable devices, means for inserting the control device in the printing device, and means operated by the main operating mechanism for adjusting said adjustable devices when the control device is inserted.

23. In a machine of the class described, the combination with a printing device adapted to receive a control device, of a plurality of control devices separate from said printing device but insertible singly therein and each including adjustable devices, selective means for establishing a coöperative relation between said printing device and one of said control devices, and means carried by the printing device for adjusting the adjustable devices of the selected control device.

24. In a machine of the class described, the combination with a printing device including adjustable printing means, of a control device separated from the printing device but adapted to be inserted therein to form a part of said printing device and including adjustable devices, connections for adjusting the printing means to an extent commensurate to the adjustment of the adjustable devices, and means carried by the printing device for adjusting said adjustable devices.

25. In a machine of the class described, the combination with a main operating mechanism, of a printing device including adjustable printing means, a control device separate from the printing device but adapted to be inserted therein to form a part of said printing device and including adjustable devices, connections for adjusting the printing means to an extent commensurate to the adjustment of the adjustable devices, and means operated by the main operating mechanism for adjusting said adjustable devices.

26. In a machine of the class described, the combination with a main operating mechanism, of a printing device including adjustable printing means, a control device separate from the printing device but adapted to be inserted therein to form a part of said printing device and including adjustable devices, connections for adjusting the printing means to an extent commensurate to the adjustment of the adjustable devices, and means carried by the printing device and operated by the main operating mechanism for adjusting said adjustable devices.

27. In a machine of the class described, the combination with a main operating mechanism, of a printing device comprising a rotary printing drum, a series of control devices and a rotatable carrier common to all of said control devices, supporting means formed on said carrier for detachably supporting said control devices, supporting means formed on said printing drum, manually operable selective means operable as a preliminary to an operation of the main operating mechanism to position one of said control devices relative to the supporting means on the printing drum, means operable upon an operation of the main operating mechanism for transferring the positioned control device to the supporting means on the printing drum and then restoring the same to the common carrier, and means for rotating the printing drum while the selected control device is supported thereby.

28. In a machine of the class described, the combination with a printing device including adjustable printing means, of a control device adapted to form a part of said printing device and including adjustable devices, and connections for adjusting said printing means, said connections including graduated bars adapted to coöperate with said adjustable devices, gravity devices connected to the said bars and racks connected to the gravity devices and coöperating with the printing means.

29. In a machine of the class described, the combination with a printing device including adjustable printing means, of a control device adapted to form a part of said printing device and including a step by step counter comprising a series of differentially adjustable slides, and connections intermediate said control device and printing means for adjusting the latter to an extent appropriate to the adjustment of the said slides, said connections including a series of graduated bars adapted to coöperate with said slides, driving means for said bars and racks connected to the gravity devices and coöperating with the printing means.

30. In a machine of the class described, the combination with a printing device including adjustable printing means, of a control device adapted to form a part of said printing device and including adjustable devices, means carried by the printing device for adjusting said adjustable devices; and connections for adjusting said printing means, said connection including graduated bars adapted to coöperate with said adjustable devices, gravity devices connected to the said bars, and racks connected to the gravity devices and coöperating with the printing means.

31. In a machine of the class described, the combination with a printing device including adjustable printing means, of a control device adapted to form a part of said printing device and including a step by step counter comprising a series of differentially adjustable slides, means carried by the printing device for adjusting said slides, and connections intermediate said control device and printing means for adjusting the latter to an extent appropriate to the adjustment of said slides, said connections including a series of graduated bars adapted to coöperate with said slides, driving means for said bars and racks connected to the driving means and coöperating with the printing means.

32. In a machine of the class described, the combination with a printing device, of a control device adapted to form a part of said printing device and including adjustable devices, means carried by the printing device for adjusting said adjustable devices, and manipulative means for disabling said adjusting means at will.

33. In a machine of the class described, the combination with a main operating mechanism, of a printing device operated thereby, a control device adapted to form a part of said printing device and including adjustable devices, means operated by the main operating mechanism for adjusting said adjustable devices, and manipulative means for disabling said adjusting means at will.

34. In a machine of the class described, the combination with a main operating mechanism, of a printing device operated thereby, a control device adapted to form a part of said printing device and including adjustable devices, means carried by the printing device and actuated by the main operating mechanism for adjusting said adjustable devices, and manipulative means for disabling said adjusting means at will.

35. In a machine of the class described, the combination with a printing device adapted to receive a control device, a control device including adjustable devices, means for inserting said control device in the printing device, means for adjusting said adjustable devices when the control device is inserted, and manipulative means for disabling said adjusting means at will.

36. In a machine of the class described, the combination with a main operating mechanism, of a printing device operated thereby and adapted to receive a control device, a control device including adjustable devices, means for inserting the control device in the printing device, means operated by the main operating mechanism for adjusting said adjustable devices when the control device is inserted, and manipulative means for disabling said adjusting means at will.

37. In a machine of the class described, the combination with a printing device adapted to receive a control device, of a plurality of control devices each including adjustable devices, selective means for establishing a coöperative relation between said printing device and one of said control devices, means carried by the printing device for adjusting the adjustable devices of the selected control device, and manipulative means for disabling said adjusting means at will.

38. In a machine of the class described, the combination with a printing device including adjustable printing means, of a control device adapted to form a part of said printing device and including adjustable devices, connections for adjusting the printing means to an extent commensurate to the adjustment of the adjustable devices, means carried by the printing device for adjusting said adjustable devices, and manipulative means for disabling said connections and adjusting means at will.

39. In a machine of the class described, the combination with a main operating mechanism, of a printing device including adjustable printing means, a control device adapted to form a part of said printing device and including adjustable devices, connections for adjusting the printing means to an extent commensurate to the adjustment of the adjustable devices, means operated by the main operating mechanism for adjusting said adjustable devices, and manipulative means for disabling said connections and adjusting means at will.

40. In a machine of the class described, the combination with a main operating mechanism, of a printing device including adjustable printing means, a control device adapted to form a part of said printing device and including adjustable devices, connections for adjusting the printing means to an extent commensurate to the adjustment of the adjustable devices, means carried by the printing device and operated by the main operating mechanism for adjusting said adjustable devices, and manipulative means for disabling the said connections and adjusting means at will.

41. In a machine of the class described, the combination with a printing device including adjustable printing means, of a control device adapted to form a part of said printing device and including adjustable devices, connections for adjusting said printing means, said connections including graduated bars adapted to coöperate with said adjustable devices, gravity devices connected to the said bars and racks connected to the gravity devices and coöperating with the printing means, and manipulative means for disabling said connections at will.

42. In a machine of the class described, the combination with a printing device including adjustable printing means, of a control device adapted to form a part of said printing device and including adjustable devices, connections for adjusting said printing means, said connections including graduated bars adapted to coöperate with said adjustable devices, gravity devices connected to the said bars and racks connected to the gravity devices and coöperating with the printing means, and manipulative means for establishing or destroying the coöperative relation between the racks and printing means at will.

43. In a machine of the class described, the combination with a printing device including adjustable printing means, of a control device adapted to form a part of said printing device and including a step by step counter comprising a series of differentially adjustable slides, connections intermediate said control device and printing means for adjusting the latter to an extent appropriate to the adjustment of the said slides, said connections including a series of graduated bars adapted to coöperate with said slides, driving means for said bars and racks connected to the gravity devices and coöperating with the printing means, and manipulative means for enabling or disabling said connections at will.

44. In a machine of the class described, the combination with a printing device including adjustable printing means, of a control device adapted to form a part of said printing device and including a step by step counter comprising a series of differentially adjustable slides, connections intermediate said control device and printing means for adjusting the latter to an extent appropriate to the adjustment of the said slides, said connections including a series of graduated bars adapted to coöperate with said slides, driving means for said bars and racks connected to the gravity devices and coöperating with the printing means, and manipulative means for destroying the coöperative relation between the racks and printing means at will.

45. In a machine of the class described, the combination with a printing device including adjustable printing means, of a control device adapted to form a part of said printing device and including a step by step counter comprising a series of differentially adjustable slides, connections intermediate said control device and printing means for adjusting the latter to an extent appropriate to the adjustment of the said slides, said connections including a series of graduated bars adapted to coöperate with said slides, driving means for said bars and racks connected to the gravity devices and coöperating with the printing means, an adjustable guide frame for supporting said racks and manipulative means operable at will for adjusting said frame to enable or disable the coöperative relation between the racks and printing means.

46. In a machine of the class described, the combination with a printing device including adjustable printing means, of a control device adapted to form a part of said printing device and including adjustable devices, means carried by the printing device for adjusting said adjustable devices; connections for adjusting said printing means, said connections including graduated bars adapted to coöperate with said adjustable devices, gravity devices connected to the said bars, and racks connected to the gravity devices and coöperating with the printing means; an adjustable guide frame for supporting said racks; and manipulative means operable at will for adjusting said frame to control the effectivity of said racks.

47. In a machine of the class described, the combination with a printing device including adjustable printing means, of a control device adapted to form a part of said printing device and including a step by step counter comprising a series of differentially adjustable slides; means carried by the printing device for adjusting said slides; connections intermediate said control device and printing means for adjusting the latter to an extent appropriate to the adjustment of said slides, said connections including a series of graduated bars adapted to coöperate with said slides, driving means for said bars and racks connected to the driving means and coöperating with the printing means, an adjustable guide frame for supporting said racks, and manipulative means operable at will to adjust said frame to control the effectivity of said racks and adjusting means.

48. In a machine of the class described, the combination with a printing device including adjustable printing means, of a control device adapted to form a part of said printing device and including a step by step counter comprising a series of differentially adjustable slides, means carried by the printing device for adjusting said slides, connections intermediate said control device and printing means for adjusting the latter to an extent appropriate to the adjustment of said slides, said connections including a series of graduated bars adapted to coöperate with said slides, driving means for said bars and racks connected to the driving means and normally coöperating with the printing means, an adjustable guide frame for supporting said racks, and manipulative means operable at will for disestablishing the coöperative relation between said racks and printing means and disabling said adjusting means.

49. In a machine of the class described, the combination with a main operating mechanism, of a series of recording control devices, a printing device adapted to receive one of said control devices, means operable as a preliminary to an operation of the main operating mechanism for establishing a coöperative relation between said printing device and one of said control devices, means operable upon an operation of said main operating mechanism for inserting the selected control device in the printing device, impression means for taking an impression from said printing device and selected control device, and manipulative means for disabling the impression means at will.

50. In a machine of the class described, the combination with a main operating mechanism, of a series of recording control devices, and means for supporting the same, a printing device adapted to receive one of said control devices, means operable as a preliminary to an operation of the main operating mechanism for effecting a relative movement of the printing device and supporting means to establish a coöperative relation between the printing device and one of said control devices, impression means for taking an impression from said printing device and selected control device, and manipulative means for disabling said impression means at will.

51. In a machine of the class described, the combination with a main operating mechanism, of a series of control devices and means for supporting the same, a printing device adapted to receive one of said control devices, means operable as a preliminary to an operation of the main operating mechanism for effecting a relative movement of the printing device and supporting means to establish a coöperative relation between the printing device and one of said control devices, means operable upon an operation of the main operating device for transferring the positioned control device from the supporting means to the printing device, impression means for taking an impression from the printing device and selected control device while the latter is supported by the former, and manipulative means for disabling said impression means at will.

52. In a machine of the class described, the combination with a printing device adapted to print on a check strip and audit strip, of a printing control device adapted to print on both of said strips, separate impression means for the same strips adapted to take impressions from the printing and control devices and manipulative means for disabling the impression means for the check strip at will.

53. In a machine of the class described, the combination with a printing device adapted to print on a check strip and audit strip, of a printing control device adapted to print on both of said strips, separate impression means for the said strips, an adjustable support for the check strip impression means, and a manipulative device for said adjustable support for rendering said check strip impression means effective or ineffective at will.

54. In a machine of the class described, the combination with a printing device adapted to print on a check strip and audit strip, of a printing control device adapted to be supported by said printing device and to print on both of said strips, adjustable devices carried by the control device, duplicate sets of adjustable printing means, one for each strip and carried by the printing device, connection intermediate said control device and printing means for adjusting the latter to an extent appropriate to the adjustment of the adjustable devices, duplicate impression means one for each strip and a manipulative device for disabling the connections and impression means appropriate to one of said strips at will.

In testimony whereof I affix my signature in the presence of two witnesses.

HARRIET B. WILLS,
*Executrix of the estate of Frank J. Wills.*
Witnesses:
  JOHN B. WILLS,
  CARL BEUST.